(12) United States Patent
Kojima et al.

(10) Patent No.: US 6,240,801 B1
(45) Date of Patent: Jun. 5, 2001

(54) FRICTION DAMPER AND PEDAL DEVICE FOR VEHICLE HAVING THE FRICTION DAMPER

(75) Inventors: Masamitsu Kojima; Yoshiteru Igarashi, both of Fujisawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 09/270,747

(22) Filed: Mar. 16, 1999

(30) Foreign Application Priority Data

Mar. 20, 1998 (JP) ................................................ 10-092389
Mar. 23, 1998 (JP) ................................................ 10-095423
Oct. 15, 1998 (JP) ................................................ 10-294304

(51) Int. Cl.⁷ ...................................................... G05G 1/14
(52) U.S. Cl. ............................................. 74/513; 267/155
(58) Field of Search ............................. 74/512, 513, 514, 74/560; 267/155, 154, 208, 275, 277, 278

(56) References Cited

U.S. PATENT DOCUMENTS

| | | | | |
|---|---|---|---|---|
| 1,619,035 | * | 3/1927 | Rafter .................................... | 267/208 |
| 4,944,269 | * | 7/1990 | Imoehl ................................ | 74/513 X |
| 5,295,409 | * | 3/1994 | Byram et al. ........................... | 74/514 |
| 5,408,899 | * | 4/1995 | Stewart .................................. | 74/513 |
| 5,529,296 | | 6/1996 | Kato et al. . | |
| 5,697,260 | * | 12/1997 | Rixon et al. ........................ | 74/513 X |

FOREIGN PATENT DOCUMENTS 4-128519    4/1992   (JP) .
6299874    10/1994   (JP) .

* cited by examiner

*Primary Examiner*—Mary Ann Green
(74) *Attorney, Agent, or Firm*—Nixon & Vanderhye

(57) ABSTRACT

A friction damper includes: a hollow cylindrical member with a bottom; a movable member disposed in said hollow cylindrical member in such a manner as to be movable in an axial direction of hollow cylindrical member but immovable about an axis of hollow cylindrical member; a coil spring disposed between movable member and the bottom of hollow cylindrical member, one end of said coil spring abutting against the bottom of hollow cylindrical member and another end thereof abutting against movable member; a rotating member disposed in hollow cylindrical member in such a manner as to oppose movable member and to be relatively rotatable about the axis of hollow cylindrical member; and a frictionally-resisting-force generating mechanism for generating a frictionally resisting force to the relative rotation of rotating member with respect to hollow cylindrical member, and for causing movable member to move away from rotating member in the axial direction against the resiliency of coil spring and to approach the bottom of hollow cylindrical member so as to increase the spring force of coil spring, thereby increasing the frictionally resisting force.

15 Claims, 17 Drawing Sheets

FIG. 18A
FIG. 18B
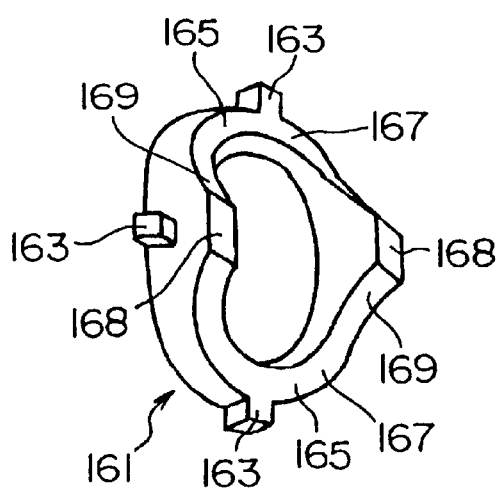
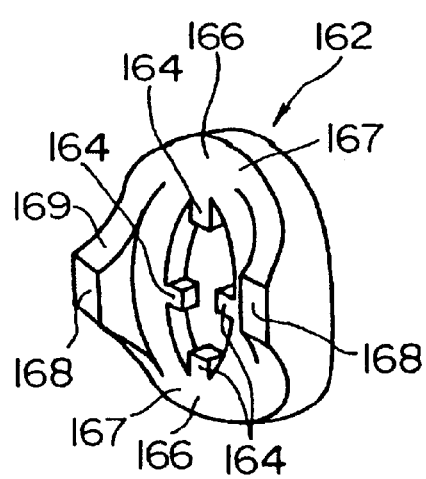
FIG. 19
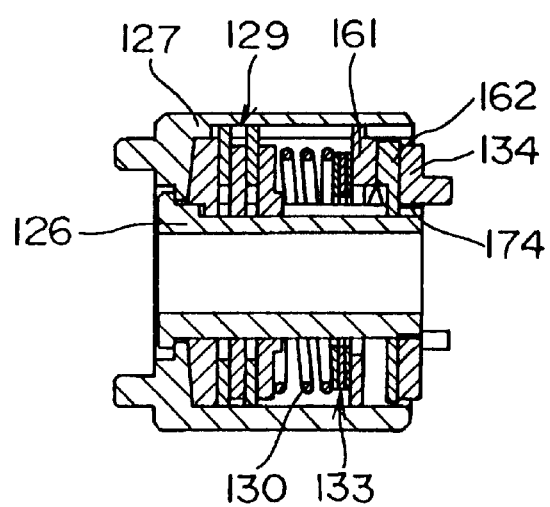

FRICTION DAMPER AND PEDAL DEVICE FOR VEHICLE HAVING THE FRICTION DAMPER

BACKGROUND OF THE INVENTION

1. Field of the Invention

The present invention relates to a friction damper, and more particularly to a friction damper suitable for imparting an appropriate brake to an accelerator pedal, a brake pedal, a clutch pedal, or the like of a vehicle and a pedal device having the friction damper.

2. Description of the Related Art

Pedal devices, including an accelerator pedal, a brake pedal, a clutch pedal, and the like of a vehicle, are each comprised of a pedal disposed at an upper-limit position at which the pedal can be pressed down as well as an urging means consisting of a coil spring for urging the pedal in a direction in which the pedal returns to its upper-limit position when the pedal was pressed down.

In the case of the pedal device including an accelerator pedal, for example, as the accelerator pedal is pressed down, a throttle is opened or closed in the case of a gasoline engine, and a fuel injector is actuated in the case of a diesel engine. Conventionally, to open or close the throttle or actuate the fuel injector, the accelerator pedal and the throttle or the accelerator pedal and the fuel injector are linked together by an accelerator wire cable, and the accelerator pedal is adapted to pull the accelerator wire cable as it is pressed down.

Accordingly, when the accelerator pedal is pressed down, a reaction force (resisting force) of a value in which the resilient reaction force of the coil spring and the tensile reaction force of the accelerator wire cable are added together is applied to the accelerator pedal.

Meanwhile, fine control of fuel injection for the automotive engine is required for the purposes of low fuel consumption of vehicles and reduction of carbon dioxide, and electronic control of fuel injection such as the regulation of the throttle valve opening based on the pressing down of the accelerator pedal has been put to practical use.

In vehicles in which fuel injection of the engine is effected by electronic control, the accelerator wire cable arranged between the accelerator pedal and the throttle valve is normally omitted. With the vehicles without the accelerator wire cables, however, the reaction force with respect to the pedal pressing force differs in comparison with vehicles with the accelerator wire cables, and if a general driver who is accustomed to driving a vehicle with the accelerator wire cable drives the vehicle without the accelerator wire cable, there is a possibility of excessively pressing down on the accelerator, thereby consuming fuel more than before.

To obtain a large reaction force with respect to the pedal pressing force, if the spring force of a return spring for returning the pedal arm to the initial position of rotation is simply made large, there is a possibility of causing early fatigue to the pedal pressing foot due to the large reaction force from the return spring during constant traveling.

As a countermeasure for overcoming this problem, an arrangement has been proposed in which the pedal arm is linked to one end of a dummy cable passed through a fixed helical pipe, the other end of the dummy cable being terminated via a coil spring, to ensure that a reaction force exhibiting a hysteresis characteristic with respect to the pedal pressing force, which is similar to the conventional case in which the accelerator wire cable is provided, can be obtained by the dummy cable. However, since this countermeasure using the dummy cable requires a relatively large space for installing the dummy cable, this countermeasure can be adopted only in vehicles of large vehicle types, such as trucks and RVs, in which there is sufficient leeway in space. In addition, since various factors are involved, the adjustment of reaction force by using the dummy cable is relatively difficult, and there is a possibility of increasing the cost in order to set the reaction force to a desired value. Furthermore, although, in order to obtain the hysteresis characteristic, a metallic dummy cable is allowed to slide within the inner surface of a resin sheathing of the pipe so as to produce sliding resistance between the metallic dummy cable and the inner surface of the resin sheathing of the pipe, there is a possibility that a large change in the characteristic can occur due to the wear caused by this sliding over a long period of use.

The above-described problem occurs not only in the accelerator pedals, but can also occur in cases where appropriate rotational resistance is produced by using the above-described dummy cable or the like in brake pedals or clutch pedals, for example.

SUMMARY OF THE INVENTION

The present invention has been devised in view of the above-described circumstances, and it is an object of the present invention to provide a pedal device which makes it possible to simply set the hysteresis characteristic concerning the reaction force acting on the pedal to a desired value without using the accelerator wire cable and the dummy cable, as well as a friction damper suitable for use in the pedal device.

Another object of the present invention is to provide a pedal device which is capable of obtaining an appropriate reaction force with respect to the pedal pressing force, is capable of being installed compactly in comparison with the dummy cable, makes it possible to effect very simply the adjustment of reaction force having a hysteresis characteristic, and exhibits a small change in the characteristic, as well as a friction damper suitable for use in the pedal device.

Still another object of the present invention is to provide a friction damper which is capable of varying the magnitude of reaction force, and a pedal device using the friction damper.

A further object of the present invention is to provide a friction damper which is capable of varying the value of a resisting torque in correspondence with relative rotational displacement, and a pedal device using the friction damper.

To attain the above objects, in accordance with a first aspect of the present invention, there is provided a damper comprising: a hollow cylindrical member with a bottom; a movable member disposed in the hollow cylindrical member in such a manner as to be movable in an axial direction of the hollow cylindrical member but immovable about an axis of the hollow cylindrical member; a spring means disposed between the movable member and the bottom of the hollow cylindrical member, one end of the spring means abutting against the bottom of the hollow cylindrical member and another end thereof abutting against the movable member; a rotating member disposed in the hollow cylindrical member in such a manner as to oppose the movable member and to be relatively rotatable about the axis of the hollow cylindrical member; and a frictionally-resisting-force generating means for generating a frictionally resisting force to the relative rotation of the rotating member with respect to the hollow cylindrical member, and for causing the movable member to move away from the rotating member in the axial direction against the resiliency of the spring means and to approach the bottom of the hollow cylindrical member so as to increase the spring force of the spring means, thereby increasing the frictionally resisting force.

Furthermore, to attain the above objects, in accordance with a second aspect of the present invention, there is provided a friction damper comprising: an inner member extending like a shaft; a tubular outer member disposed coaxially with the inner member and on an outer side of the inner member; a frictionally engaging means provided in an annular space on a radially outward side of the inner member and on a radially inward side of the outer member; a resilient means provided in the annular space; an urging-force varying means provided in the annular space, wherein the frictionally engaging means has a first portion which rotates integrally with the inner member and a second portion which rotates integrally with the outer member and is provided in such a manner as to be capable of coming into contact with the first portion in the axial direction, wherein the resilient means is arranged to urge the first portion and the second portion in a direction in which the first portion and the second portion are brought into contact with each other and are pressed against each other, and wherein the urging-force varying means is arranged to make variable an urging force of the resilient means in correspondence with a relative rotational displacement of the inner member and the outer member.

In accordance with the friction damper according to the second aspect of the invention, when a relative rotational displacement occurs between the inner member and the outer member, the urging force of the resilient means for pressing the first portion and the second portion against each other is varied by the urging-force varying means.

In the friction damper in accordance with a third aspect of the invention, in the friction damper according to the second aspect, a shaft inserting hole extending in the axial direction is penetratingly formed in a center of the inner member.

In the friction damper in accordance with a fourth aspect of the invention, in the friction damper according to the second or third aspect, a flange portion projecting radially outward is formed at an axial end of the inner member, and the first portion is formed by the flange portion.

In the friction damper in accordance with a fifth aspect of the invention, in the friction damper according to any one of the second to fourth aspects, a friction plate which rotates integrally with the inner member is provided in the annular space in such a manner as to be movable in the axial direction, and the first portion is formed by the friction plate.

In the friction damper in accordance with a sixth aspect of the invention, in the friction damper according to any one of the second to fifth aspects, the outer member has a hollow cylindrical portion, a longitudinal end of the hollow cylindrical portion is formed as an open end which is open, a flange portion projecting radially inward is formed at another longitudinal end of the hollow cylindrical portion, and the second portion is formed by the flange portion.

In the friction damper in accordance with a seventh aspect of the invention, in the friction damper according to any one of the second to sixth aspects, a friction plate which rotates integrally with the outer member is provided in the annular space in such a manner as to be movable in the axial direction, and the second portion is formed by the friction plate.

In the friction damper in accordance with an eighth aspect of the invention, in the friction damper according to any one of the second to seventh aspects, the resilient means is disposed between the frictionally engaging means and the urging-force varying means in the annular space, and the urging-force varying means is arranged to change an axially extending space for accommodating the resilient means, in correspondence with the relative rotational displacement of the inner member and the outer member.

In the friction damper in accordance with a ninth aspect of the invention, in the friction damper according to any one of the second to eighth aspects, the urging-force varying means is provided with a restricting means for restricting the movement of the urging-force varying means in a direction away from the frictionally engaging means.

In the friction damper in accordance with a 10th aspect of the invention, in the friction damper according to the ninth aspect, the urging-force varying means is provided with an annular inner variable member joined integrally to the inner member, an annular outer variable member disposed in such a manner as to oppose the inner variable member and joined integrally to the outer member, a cam portion formed on a surface of the inner variable member opposing the outer variable member, and a cam portion formed on a surface of the outer variable member opposing the inner variable member, the cam portions being arranged to change a distance between the inner variable member and the outer variable member in the axial direction in correspondence with the relative rotational displacement of the inner member and the outer member.

In the friction damper in accordance with an 11th aspect of the invention, in the friction damper according to any one of the second to eighth aspects, the urging-force varying means is formed by a variable member which is threadedly joined to one of the inner member and the outer member, and is joined to another one of the inner member and the outer member in such a manner as to be unrotatable but movable in the axial direction.

In the friction damper in accordance with a 12th aspect of the invention, in the friction damper according to any one of the second to 11th aspects, the inner member is joined to a rotating shaft in such a manner as to be rotatable integrally with the shaft, the outer member is unrotatably joined to a member which rotatably supports the shaft, and the second portion is unrotatable together with the outer member.

Furthermore, to attain the above objects, in accordance with a 13th aspect of the present invention, there is provided a pedal device for a vehicle, comprising: a pedal arm which is rotatably supported by a supporting frame; a first spring means for rotatively urging the pedal arm to an initial position of its rotation; and a damper for imparting a resisting force to the rotation of the pedal arm, wherein the damper includes: a hollow cylindrical member with a bottom; a movable member disposed in the hollow cylindrical member in such a manner as to be movable in an axial direction of the hollow cylindrical member but immovable about an axis of the hollow cylindrical member; a second spring means disposed between the movable member and the bottom of the hollow cylindrical member, one end of the spring means abutting against the bottom of the hollow cylindrical member and another end thereof abutting against the movable member; a rotating member disposed in the hollow cylindrical member in such a manner as to oppose the movable member and to be relatively rotatable about the axis of the hollow cylindrical member; and a frictionally-resisting-force generating means for generating a frictionally resisting force as the resisting force to the relative rotation of the rotating member with respect to the hollow cylindrical member, and for causing the movable member to move away from the rotating member in the axial direction against the resiliency of the second spring means and to approach the bottom of the hollow cylindrical member so as to increase the spring force of the second spring means, thereby increasing the frictionally resisting force, and wherein the rotation of the pedal arm is transmitted as the relative rotation of the hollow cylindrical member and the rotating member.

In accordance with the pedal device according to the 13th aspect, when the rotating member is relatively rotated with respect to the hollow cylindrical member due to the rotation of the pedal arm based on the pressing down of the pedal, an increasing frictionally resisting force is generated by the frictionally-resisting-force generating means. On the other hand, when the pressing down of the pedal is canceled and the rotating member is relatively reversely rotated with respect to the hollow cylindrical member, the frictionally resisting force in the frictionally-resisting-force generating means becomes small. Consequently, by virtue of the frictionally resisting force having this hysteresis characteristic, a resisting force similarly having the hysteresis characteristic is imparted to the rotation of the pedal arm. This resistance force makes it possible, for instance, to prevent the accelerator pedal from being excessively pressed down, which can otherwise consume fuel more than before.

In the pedal device for a vehicle in accordance with a 14th aspect of the invention, in the pedal device according to the 13th aspect, the frictionally-resisting-force generating means has a projection formed integrally on one surface of the rotating member, opposing the movable member, in such a manner as to project in the axial direction toward one surface of the movable member and a projection formed integrally on the one surface of the movable member, opposing the rotating member, in such a manner as to project in the axial direction toward the one surface of the rotating member, the projections being arranged to come into planar contact with each other.

In the pedal device in accordance with the 14th aspect, since the frictionally-resisting-force generating means is formed by projections which are disposed between the movable member and the rotating member and are formed integrally to the movable member and the rotating member, respectively, the pedal device can be made very compact, and can be installed by making effective use of a small space. Moreover, since the projections are brought into planar contact with each other, the coefficients of friction at the contact surfaces can be set appropriately, thereby making it possible to determine a resisting force having a hysteresis characteristic which can be imparted to the rotation of the pedal arm, and making it possible to effect the adjustment of the reaction force very simply.

In the pedal device for a vehicle in accordance with a 15th aspect of the invention, in the pedal device according to the 13th or 14th aspect, the frictionally-resisting-force generating means has an inclined surface formed on the one surface of the rotating member opposing the movable member, and an inclined surface formed on the one surface of the movable member opposing the rotating member and arranged to come into planar contact with the inclined surface formed on the one surface of the rotating member.

In accordance with the pedal device in accordance with the 15th aspect, by appropriately setting the coefficients of friction at the inclined surface formed on the one surface of the rotating member and at the inclined surface formed on the one surface of the movable member opposing the rotating member, it is possible to determine in the frictionally resisting-force generating means the resisting force with the hysteresis characteristic which can be substantially imparted to the rotation of the pedal arm, so that the adjustment of the reaction force can be effected very simply.

In the pedal device for a vehicle in accordance with a 16th aspect of the invention, in the pedal device according to any one of the 13th to 15th aspects, the frictionally-resisting-force generating means has a fixed surface which comes into planar contact with another surface of the rotating member.

In the pedal device in accordance with the 16th aspect, since it is possible to determine the resisting force with the hysteresis characteristic which can be substantially imparted to the rotation of the pedal arm by appropriately setting the coefficients of friction at the other surface of the rotating member and the fixed surface, the adjustment of the reaction force can be effected very simply in the same way as the pedal device in accordance with the 15th aspect.

It should be noted that, in the pedal device in accordance with the 16th aspect, the other surface of the rotating member and the fixed surface which are brought into planar contact with each other may be formed by inclined surfaces in the same way as the pedal device in accordance with the 15th aspect.

In the pedal device for a vehicle in accordance with a 17th aspect of the invention, in the pedal device according to the 16th aspect, the fixed surface is formed on the hollow cylindrical member.

In the pedal device in accordance with the 17th aspect, since the fixed surface is formed on the hollow cylindrical member, the pedal device can be formed more compactly. It goes without saying that the fixed surface may be formed on the supporting frame or the pedal arm, instead of being formed on the hollow cylindrical member.

In the pedal device for a vehicle in accordance with an 18th aspect of the invention, in the pedal device according to any one of the 13th to 17th aspects, the bottom of the hollow cylindrical member can be adjustably positioned in the axial direction.

In the pedal device in accordance with the 18th aspect, since the bottom of the hollow cylindrical member can be adjustably positioned in the axial direction, the initial resilient force generated by the second spring means, i.e., the initial resisting force, can be adjusted and set arbitrarily, so that an optimum initial resisting force can be obtained.

In the pedal device for a vehicle in accordance with a 19th aspect of the invention, in the pedal device according to any one of the 13th to 18th aspects, the second spring means has at least two coil springs arranged concentrically, and the at least two coil springs have mutually different moduli of elasticity.

As the second spring means, a spring means using such as rubber or a leaf spring may be used. Preferably, if the second spring means is formed by at least one coil spring, the pedal device can be made to excel in durability and simple in the structure. In addition, if the second spring means is formed by at least two coil springs having mutually different moduli of elasticity as in the case of the pedal device in accordance with the seventh aspect, one coil spring can be used for fine adjustment, and the design and adjustment of the resisting force can be effected simply. Hence, such an arrangement is very preferable from this standpoint.

In the pedal device for a vehicle in accordance with a 20th aspect of the invention, in the pedal device according to any one of the 13th to 19th aspects, the pedal arm is an accelerator pedal arm.

In the pedal device for a vehicle in accordance with the present invention, an arrangement may be provided such that the rotation of the pedal arm is transmitted to either the hollow cylindrical member or the rotating member. Preferably, however, the rotation of the pedal arm is arranged to be transmitted to the rotating member, in which case, the hollow cylindrical member is fixedly supported by the frame. In the case where the rotation of the pedal arm is arranged to be transmitted to the hollow cylindrical member, the rotating member is fixedly supported by the frame.

Furthermore, to attain the above objects, in accordance with a 21st aspect of the present invention, there is provided a pedal device comprising: a rotating shaft supported by a supporting frame; an accelerator pedal which is disposed at an upper-limit position where the accelerator pedal can be pressed down and which swings about the rotating shaft; a resisting means for generating resistance in a direction in which the pressing down of the accelerator pedal is hampered when the accelerator pedal is pressed down; and an urging means for urging the accelerator pedal in a direction in which the accelerator pedal returns to the upper-limit position when the accelerator pedal is pressed down at the upper-limit position; wherein the resisting means is formed by a friction damper in which a portion which rotates by following the swinging motion of the accelerator pedal comes into contact with a stationary portion so as to generate resistance.

In the pedal device in accordance with a 22nd aspect of the invention, in the pedal device according to the 21st aspect, the rotating shaft is supported by mutually opposing portions of the supporting frame, and the friction damper is disposed in a space between the mutually opposing portions of the supporting frame.

In the pedal device in accordance with a 23rd aspect of the invention, in the pedal device according to the 21st or 22nd aspect, the friction damper is disposed coaxially with the rotating shaft.

In the pedal device in accordance with a 24th aspect of the invention, in the pedal device according to any one of the 21st to 23rd aspects, the friction damper is arranged to generate torque of a fixed value irrespective of displacement in the swinging motion of the accelerator pedal.

In the pedal device in accordance with a 25th aspect of the invention, in the pedal device according to any one of the 21st to 23rd aspects, the friction damper is arranged such that the value of torque changes in correspondence with the displacement in the swinging motion of the accelerator pedal.

In the pedal device in accordance with a 26th aspect of the invention, in the pedal device according to the 21st aspect, the rotating shaft is rotatably supported by the supporting frame and is provided so as to rotate in interlocked relation to the swinging motion of the accelerator pedal, wherein the friction damper is disposed coaxially with the rotating shaft and includes an inner member into an interior of which the rotating shaft is inserted and which rotates integrally with the rotating shaft coaxially therewith, a tubular outer member disposed coaxially with the inner member on an outer side of the inner member in such a manner as to be unrotatable, a frictionally engaging means provided in an annular space on a radially outward side of the inner member and on a radially inward side of the outer member, and a resilient means provided in the annular space, wherein the frictionally engaging means has a first portion which rotates integrally with the inner member and a second portion which is unrotatable and is provided in such a manner as to be capable of coming into contact with the first portion, and wherein the resilient means is arranged to urge the first portion and the second portion in a direction in which the first portion and the second portion are brought into contact with each other and are pressed against each other.

In the pedal device in accordance with a 27th aspect of the invention, in the pedal device according to the 21st aspect, the rotating shaft is rotatably supported by the supporting frame and is provided so as to rotate in interlocked relation to the swinging motion of the accelerator pedal, wherein the friction damper is disposed coaxially with the rotating shaft and includes an inner member into an interior of which the rotating shaft is inserted and which rotates integrally with the rotating shaft coaxially therewith, a tubular outer member disposed coaxially with the inner member on an outer side of the inner member in such a manner as to be unrotatable, a frictionally engaging means provided in an annular space on a radially outward side of the inner member and on a radially inward side of the outer member, a resilient means provided in the annular space, and an urging-force varying means provided in the annular space, wherein the frictionally engaging means has a first portion which rotates integrally with the inner member and a second portion which is unrotatable and is provided in such a manner as to be capable of coming into contact with the first portion, wherein the resilient means is disposed between the frictionally engaging means and the urging-force varying means in the annular space and is arranged to urge the first portion and the second portion in a direction in which the first portion and the second portion are brought into contact with each other and are pressed against each other, and wherein the urging-force varying means is arranged to change an axially extending space for accommodating the resilient means, in correspondence with the relative rotational displacement of the inner member and the outer member.

In the pedal device in accordance with a 28th aspect of the invention, in the pedal device according to any one of the 21st to 27th aspects, the resisting means includes the urging means.

In the pedal devices in accordance with the 21st to 28th aspects of the invention, the resisting means is formed by a friction clutch, and the adjustment of increase or decrease of resistance occurring in the friction clutch can be made easily, so that the hysteresis characteristic in the pedal device can be easily set to a desired value.

It should be noted that the pedal arm in the device of the present invention is preferably the aforementioned accelerator pedal arm, but the pedal arm is also applicable to a brake pedal arm, a clutch pedal arm, or the like.

In accordance with the friction damper of the present invention, the value of torque can be varied in correspondence with the relative rotational displacement of the inner member and the outer member. Accordingly, the friction damper of the present invention can be used at a location where the value of torque is to be varied in correspondence with the relative rotational displacement of the inner member and the outer member.

In accordance with the pedal device of the present invention, it is possible to obtain an appropriate reaction force with respect to the pedal pressing force, the pedal device can be installed compactly in comparison with the dummy cable, and the adjustment of reaction force having a hysteresis characteristic can be made very simply.

In addition, in accordance with the pedal device of the present invention, the hysteresis characteristic can be simply set to a desired value without using a cable.

BRIEF DESCRIPTION OF THE DRAWINGS

Hereafter, a detailed description will be given of a friction damper and a pedal device having the friction damper in accordance with the present invention by citing embodiments in which the present invention is applied to an accelerator pedal device for a vehicle, particularly an automobile, illustrated in the drawings, wherein:

FIG. 7(*b*) is an explanatory diagram in which the projections, the recesses, and the stepped portions of the frictionally-resisting-force generating means which is formed integrally with the movable member are illustrated in developed form;

FIG. 8(*b*) is an explanatory diagram in which the projections, the recesses, and the stepped portions of the frictionally-resisting-force generating means which is formed integrally with the rotating member are illustrated in developed form;

FIG. 18(A) is a perspective view of a first variable plate of the embodiment illustrated in FIG. 14;

FIG. 18(B) is a perspective view of a second variable plate of the embodiment illustrated in FIG. 14;

FIG. 19 is a cross-sectional view of another example of attaching a retaining cap to an inner member in such a manner as to be incapable of coming off in the friction damper of the embodiment shown in FIG. 14;

DESCRIPTION OF THE PREFERRED EMBODIMENTS

Figure 1:
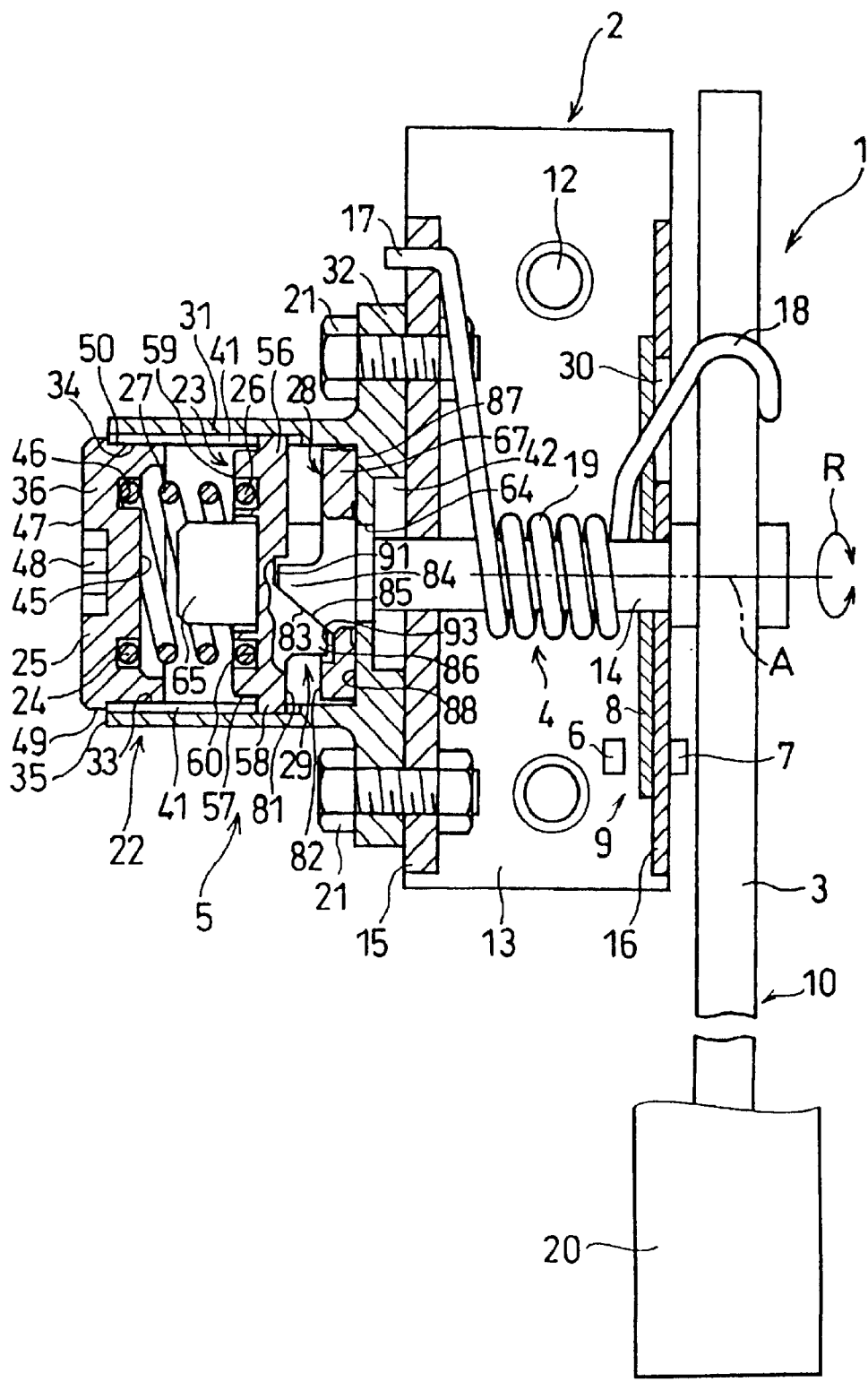
FIG. 1 is a front cross-sectional view of a preferred embodiment of a pedal device for an automobile in accordance with the present invention.

In FIGS. 1 to 10, a pedal device 1 for an automobile in accordance with an embodiment of the present invention is comprised of a supporting frame 2; a pedal arm, in this embodiment, an accelerator pedal arm 3 which is supported by the supporting frame 2 in such a manner as to be rotatable about an axis A in directions R; a spring means 4 for rotatively urging the accelerator pedal arm 3 toward an initial position of its rotation; a damper 5 serving as a resisting means for imparting a resisting force to the rotation in the R directions of the accelerator pedal arm 3 of an accelerator pedal 10, and a stopper (not shown) for stopping the rotation of the accelerator pedal arm 3 at the initial position of its rotation.

In the pedal device 1, an accelerator wire cable for linking the accelerator pedal arm 3 and a throttle or linking the accelerator pedal arm 3 and a fuel injector is not used, and an actuator is connected at the location on the throttle or the fuel injector where the accelerator wire cable is conventionally connected. The arrangement provided is such that the displacement in the rotation of the accelerator pedal arm 3 is detected by an angle detector 9, which consists of a light projector 6, a light receiver 7, a disk 8 with slits formed in its periphery and rotatable with a rotating shaft 14, which will be described later, and the like, and the actuator connected at the location on the throttle or the fuel injector is driven via an electronic controller on the basis of a detection signal from the detector 9, whereby the throttle and the fuel injector are operated on the basis of the displacement in the rotation of the accelerator pedal arm 3.

The supporting frame 2 at its bottom plate portion 13 is fixed to a vehicle body 11 by means of rivets or bolts 12 or the like, and rotatably supports the rotating shaft 14 at its both side walls 15 and 16.

In the accelerator pedal 10 having a pedal 20 and the accelerator pedal arm 3 with the pedal 20 secured to a distal end thereof, the accelerator pedal arm 3 is secured to the rotating shaft 14 by means of welding or the like, and is supported by the supporting frame 2 via the rotating shaft 14 in such a manner as to be rotatable in the R directions.

Figure 2:
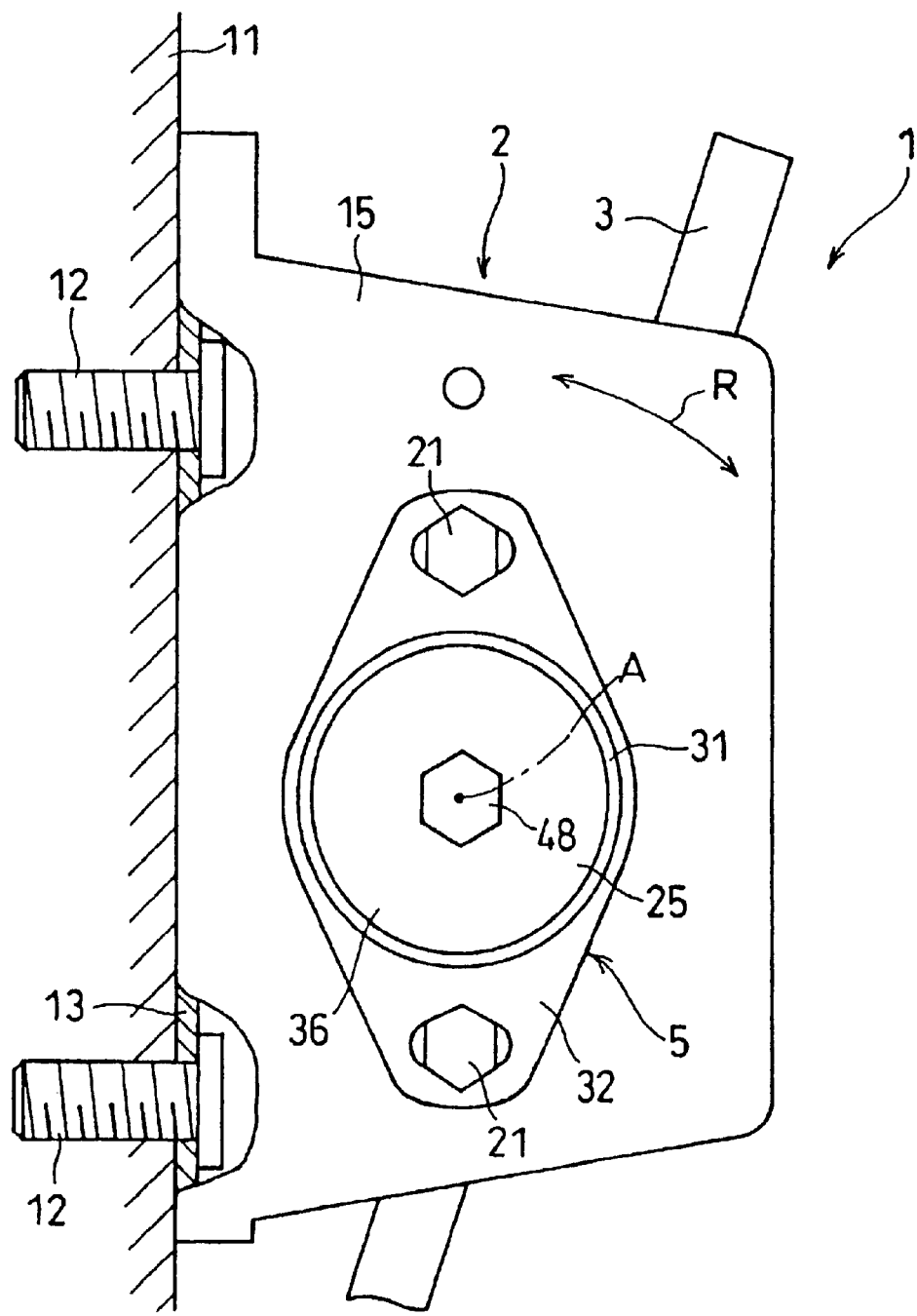
FIG. 2 is a left side view of the embodiment shown in FIG. 1.
Figure 3:
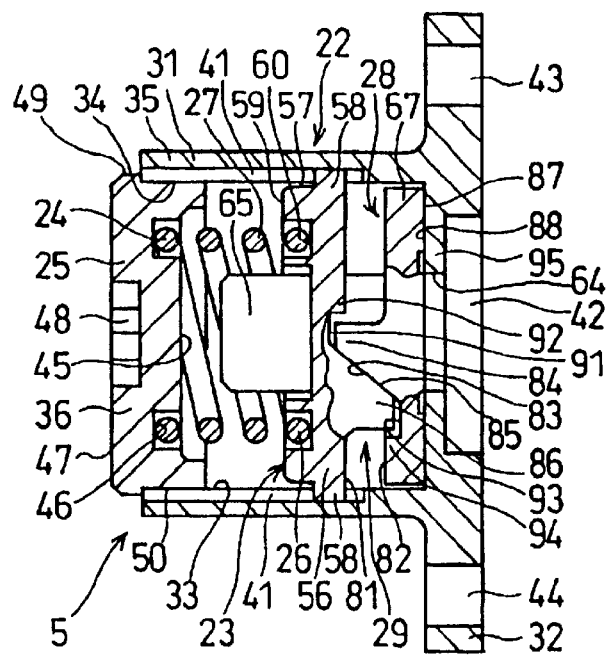
FIG. 3 is a detailed cross-sectional view of a damper of the embodiment shown in FIG. 1.
Figure 4:
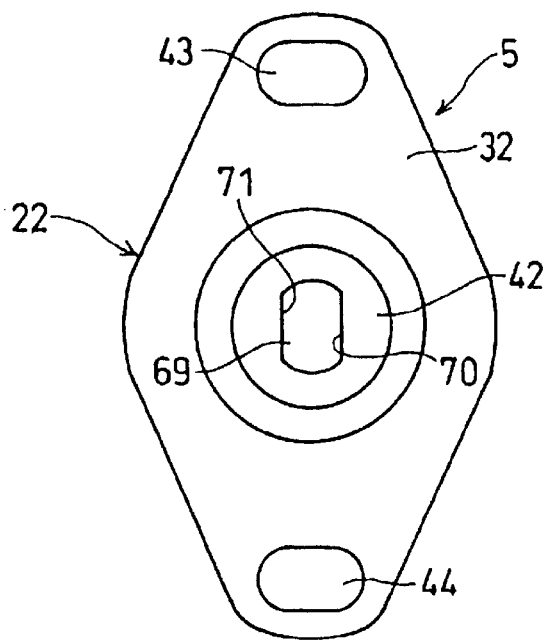
FIG. 4 is a right side view of the damper shown in FIG. 3.

The spring means 4 in this embodiment is formed by a torsion coil spring 19 in which one end portion 17 thereof is engaged with the side wall 15 of the supporting frame 2, another end portion 18 thereof is passed through a hole 30, which is formed in the side wall 16, and is engaged with the accelerator pedal arm 3, and an intermediate coil portion thereof is wound around the rotating shaft 14 between both side walls 15 and 16 with gaps therebetween, thereby constantly resiliently urging the accelerator pedal arm 3 counterclockwise in FIG. 2 in the R direction.

The damper 5 is comprised of a hollow cylindrical member 22 with a bottom fixed to the side wall 15 of the supporting frame 2 by means of bolts 12 or the like; a movable member 23 formed in the shape of an annular plate and disposed in the hollow cylindrical member 22 in such a manner as to be movable with respect to the hollow cylindrical member 22 in the direction of its axis A but immovable in directions about the axis A, i.e., in the directions R; a coil spring 27 serving as a spring means disposed between the movable member 23 and a bottom portion 25 of the hollow cylindrical member 22 and having one end 24 abutting against the bottom portion 25 of the hollow cylindrical member 22 and another end 26 abutting against the movable member 23; a rotating member 28 disposed in the hollow cylindrical member 22 in such a manner as to oppose the movable member 23 serving as a movable spring receiver and to be rotatable about the axis A in the R directions with respect to the hollow cylindrical member 22; and a frictionally-resisting-force generating means 29 which generates a frictionally resisting force as the aforementioned resisting force in the rotation in the R directions of the rotating member 28, causes the movable member 23 to move away from the rotating member 28 in the axial direction against the resiliency of the coil spring 27 and approach the bottom portion 25 of the hollow cylindrical member 22 so as to increase the spring force of the coil spring 27, thereby increasing the frictionally resisting force.

The hollow cylindrical member 22 with a bottom in this embodiment has a hollow cylindrical portion 31, a collar portion 32 formed integrally with one end face of the hollow cylindrical portion 31; and a cover portion 36 serving as a fixed spring receiver which is threadedly engaged with an internally threaded portion 34 formed on an inner peripheral surface 33 of the hollow cylindrical portion 31 and is secured to the other end portion 35 of the hollow cylindrical portion 31.

In addition to the threaded portion 34, the hollow cylindrical portion 31 has on its inner peripheral surface 33 at least one, in this embodiment six, grooves 41 (only two are shown) formed in such a manner as to extend in the direction of the axis A. The grooves 41 are arranged at equal angular intervals in the R direction.

The collar portion 32 having a substantially elliptical outer shape has a through hole 42 in its center and through holes 43 and 44 at opposite end portions in its long-axis direction. The hollow cylindrical member 22 is fixedly supported at the collar portion 32 by the side wall 15 by means of bolts 21 or the like which are passed through the through holes 43 and 44.

The collar portion 36 serving as the bottom portion 25 of the hollow cylindrical member 22 has an annular groove 46 at its end face 45, a hexagonal recess 48 in the center of its other end face 47, and an externally threaded portion 50 on its peripheral surface 49. One end 24 of the coil spring 27 is seated in the groove 46 of the cover portion 36, and the externally threaded portion 50 of the cover portion 36 is threadedly engaged with the internally threaded portion 34 by means of a rotating jig inserted in the recess 48, so that the cover portion 36 is tightened and secured to the other end portion 35 of the hollow cylindrical portion 31.

Figure 5:
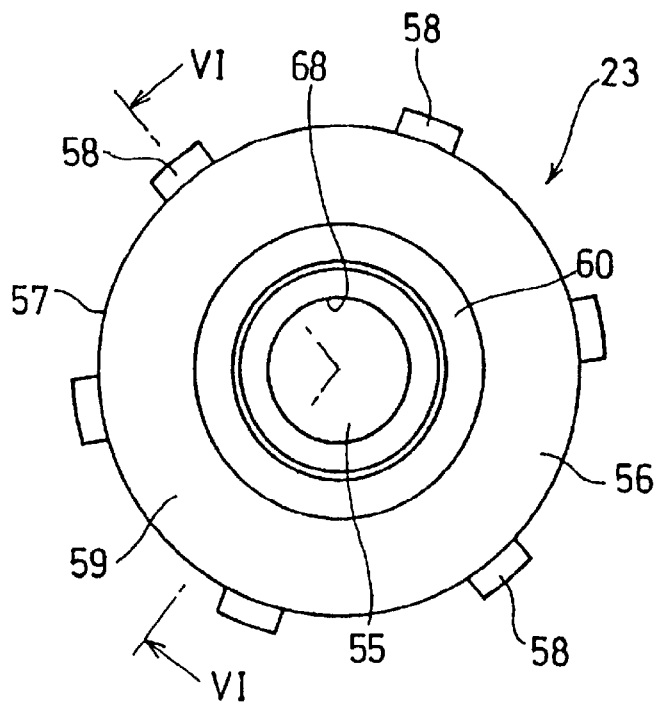
FIG. 5 is a left side view of a movable member of the damper shown in FIG. 3.
Figure 6:
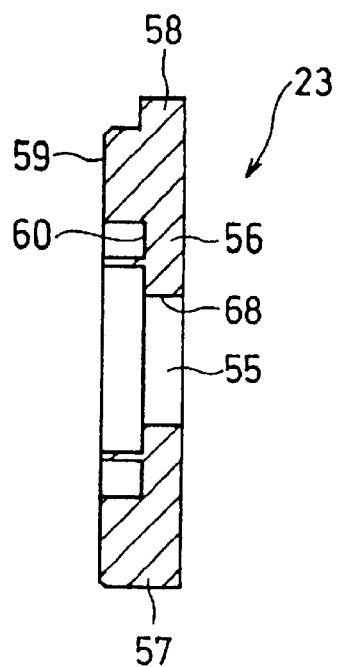
FIG. 6 is a cross-sectional view taken along line VI—VI of FIG. 5, in which projections, recesses, and stepped portions of a frictionally-resisting-force generating means are omitted.
Figure 7A:
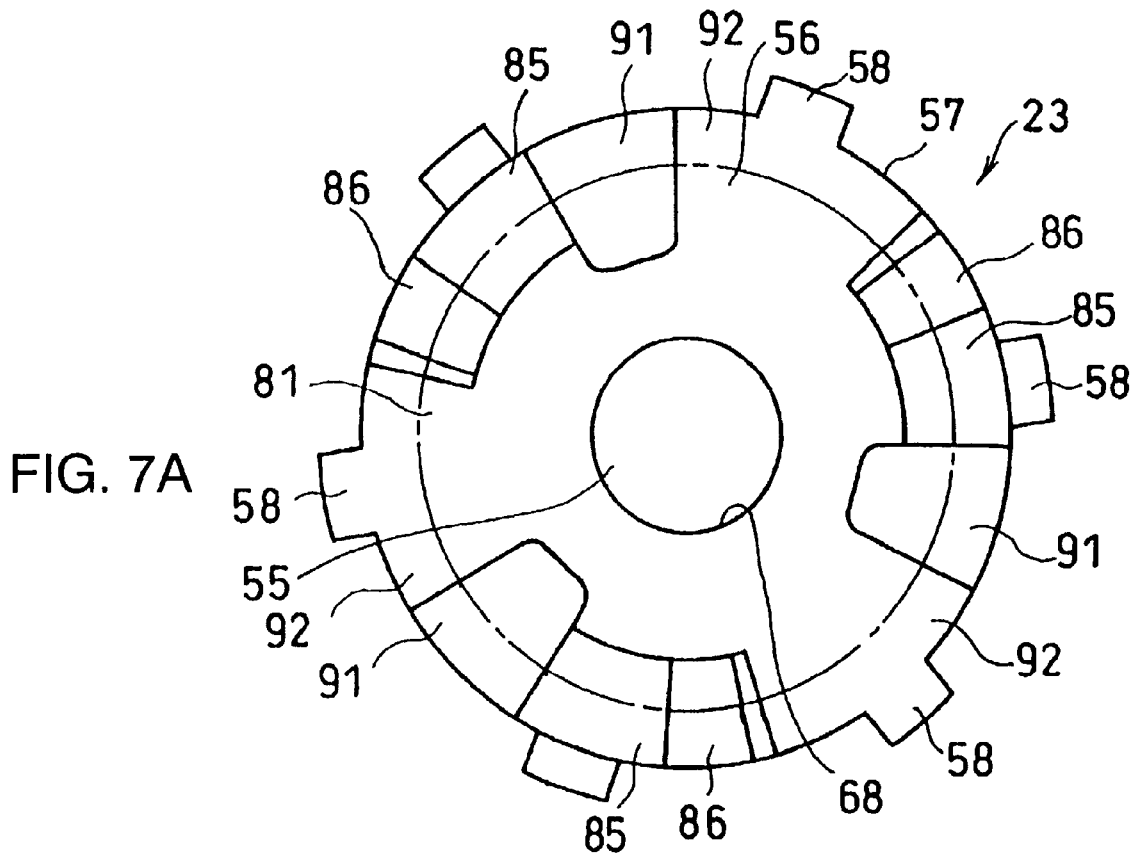
FIG. 7(*a*) is a right side view of the movable member of the damper shown in FIG. 3.
Figure 7B:
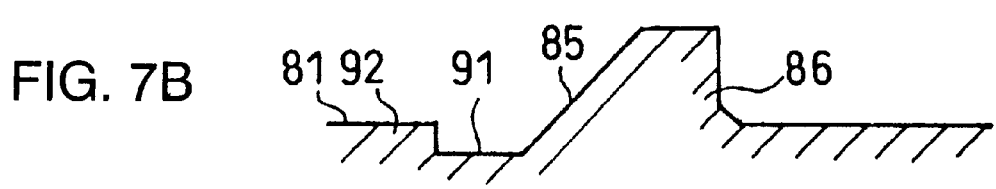
Figure 8A:
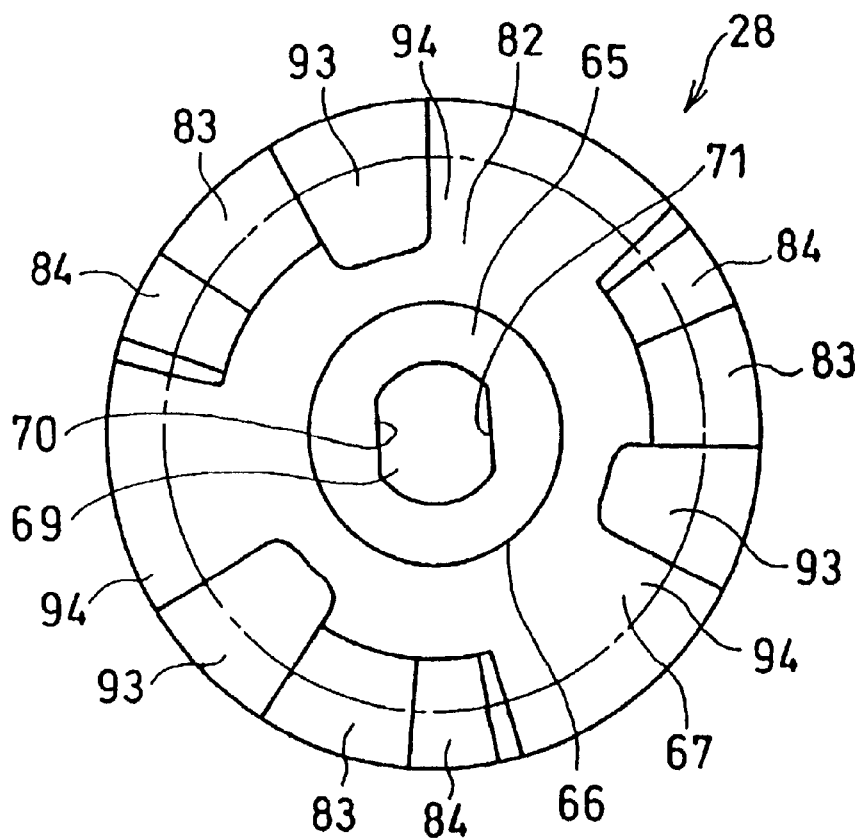
FIG. 8(*a*) is a left side view of a rotating member of the damper shown in FIG. 3.
Figure 8B:
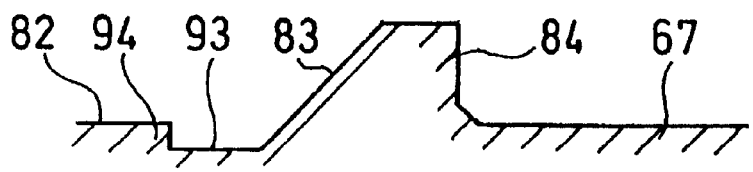
Figure 9:
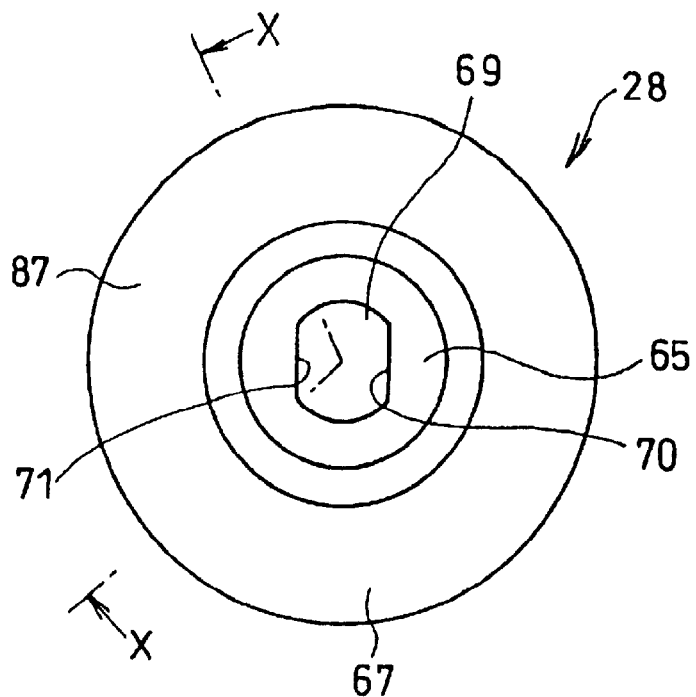
FIG. 9 is a right side view of the rotating member of the damper shown in FIG. 3.
Figure 10:
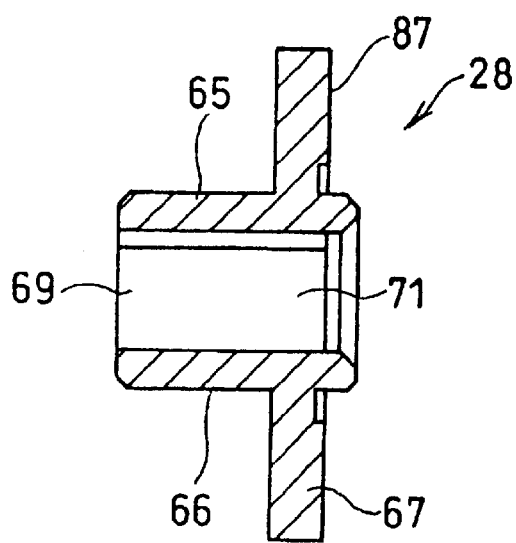
FIG. 10 is a cross-sectional view taken along line X—X of FIG. 9, in which projections, recesses, and stepped portions of the frictionally-resisting-force generating means are omitted.

As shown in detail in FIGS. 5, 7a and 7b, the movable member 23 includes a main body 56 formed in the shape of an annular plate and having a through hole 55 in its center; at least one, in this embodiment six, projections 58 formed integrally with an outer peripheral surface 57 of the main body 56; and an annular groove 60 formed in a face 59 facing one end face 45 of the cover portion 36. The projections 58 are arranged at equal angular intervals in the R direction, and are disposed in the grooves 41 in such a manner as to be movable in the direction of the axis A. As a result, the movable member 23 is movable in the direction of the axis A but immovable in the directions R. The other end 26 of the coil spring 27 is seated in the groove 60 of the main body 56.

The coil spring 27 is disposed in the hollow cylindrical portion 31 concentrically therewith in such a manner as to be resiliently compressed so as to cause the movable member 23 to move away from the cover portion 36 in the direction of the axis A.

As shown in detail particularly in FIGS. 8a, 8b, 9, and 10, the rotating member 28 has a hollow cylindrical portion 65 and an annular plate portion 67 formed integrally at one end side of an outer peripheral surface 66 of the hollow cylindrical portion 65. One end side of the hollow cylindrical portion 65 is disposed in the through hole 42, and is supported by an inner peripheral surface 64 of the collar portion 32, which defines the through hole 42, in such a manner as to be rotatable in the directions R. The other end side of the hollow cylindrical portion 65 is passed through the through hole 55, and extends in such a manner as to contact an inner peripheral surface 68 of the main body 56, which defines the through hole 55, and so as to be relatively slidable with respect to the inner peripheral surface 68 of the main body 56 in the direction of the axis A and in the R directions. A pair of mutually opposing flat surfaces 70 and 71 are formed in a central circular hole 69 of the hollow cylindrical portion 65, and one end portion of the rotating shaft 14 is fitted in the central circular hole 69 defined by the flat surfaces 70 and 71, whereby the rotation in the R directions of the pedal arm 3 is transmitted to the rotating member 28 via the rotating shaft 14.

The frictionally-resisting-force generating means 29 is comprised of at least one, in this embodiment three, projections 84 formed integrally on an outer peripheral side of an annular surface 82 of the annular plate portion 67 of the rotating member 28, which faces an annular surface 81 of the main body 56 of the movable member 23, the projections 84 projecting toward the surface 81 of the movable member 23 in the direction of the axis A and each having an inclined surface 83; at least one, in this embodiment three, projections 86 formed integrally on an outer peripheral side of the surface 81 of the main body 56 of the movable member 23, which faces the surface 82 of the annular plate portion 67 of the rotating member 28, the projections 86 projecting toward the surface 82 of the rotating member 28 in the direction of the axis A and each having an inclined surface 85 in planar contact with the inclined surface 83; and a fixed surface 88 formed on the collar portion 32 of the hollow cylindrical member 22 in such a manner as to come into planar contact with an annular surface 87 of the annular plate portion 67 of the rotating member 28.

The three projections 84 are arranged on the surface 82 at equal angular intervals in the R direction and are formed integrally on the annular plate portion 67, while the projections 86 are similarly arranged on the surface 81 at equal angular intervals in the R direction and are formed integrally on the main body 56. The inclined surfaces 83 and 85 are formed complementarily in such a manner as to come into planar contact with each other, preferably in such a manner as to be inclined about 45° with respect to the axis A.

On the surface 81, recesses 91, into which distal ends in the direction of the axis A of the respective projections 84 are fitted, as well as stepped portions 92 defining the recesses 91, are formed continuously from the respective projections 86. Meanwhile, on the surface 82 as well, recesses 93, into which distal ends in the direction of the axis A of the respective projections 86 are fitted, as well as stepped portions 94 defining the recesses 93, are formed continuously from the respective projections 84. The position of initial planar contact between the inclined surface 83 and the inclined surface 85 is defined by the stepped portion 92 and the stepped portion 94. The fixed surface 88, in this embodiment, is formed by an annular surface of an annular portion 95 which projects radially inwardly of the collar portion 32.

In the above-described pedal device 1, if the accelerator pedal 10 is pressed down, which in turn causes the accelerator pedal arm 3 to be rotated clockwise in the R direction in FIG. 2 against the resiliency of the coil spring 16, fuel injection for the engine is increased by the unillustrated electronic controller which received a detection signal from the detector 9 for detecting the rotational angle of the accelerator pedal arm 3, thereby accelerating the automobile. On the other hand, if the pressing of the accelerator pedal 10 is canceled, which in turn causes the accelerator pedal arm 3 to be rotated counterclockwise in the R direction in FIG. 2 by the resiliency of the coil spring 16, fuel injection for the engine is decreased by the unillustrated electronic controller, thereby decelerating the automobile.

Figure 11:
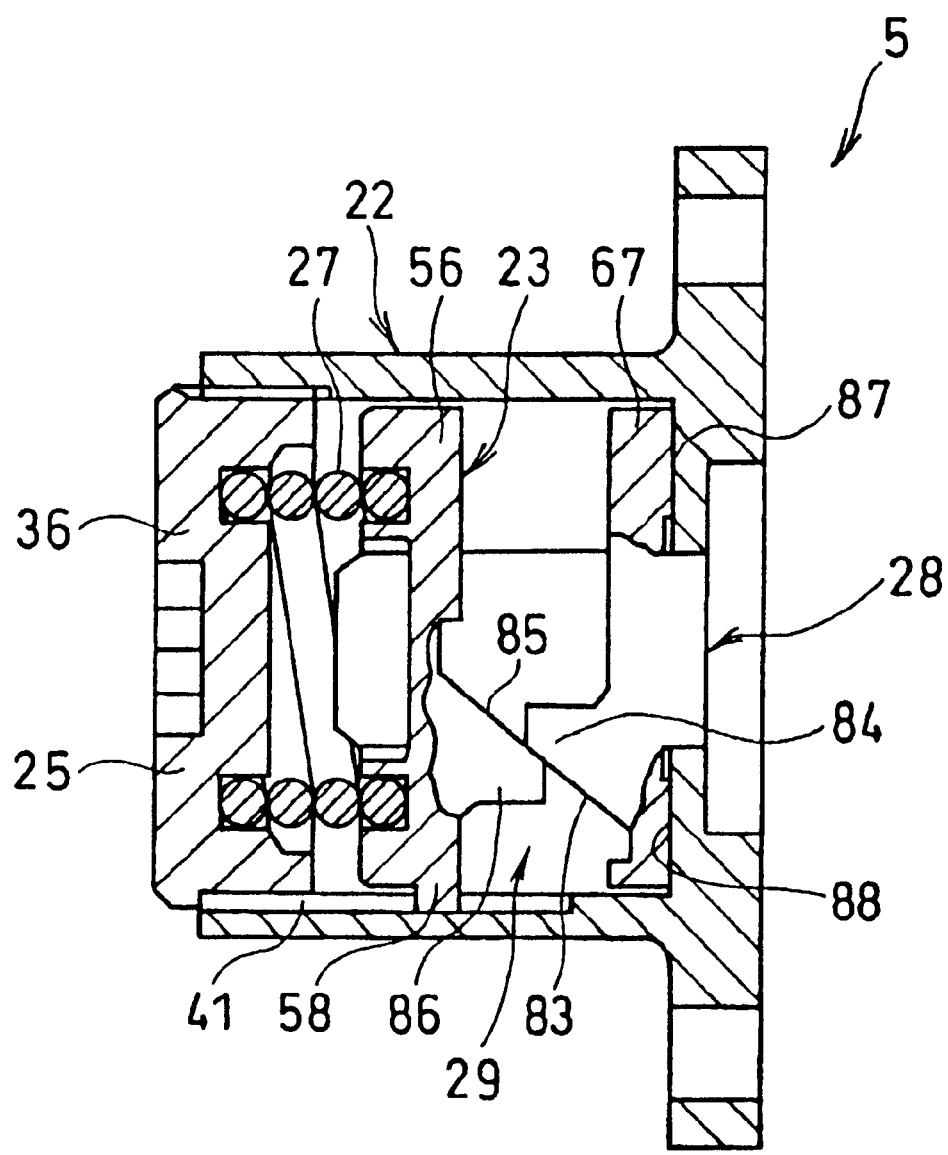
FIG. 11 is a diagram explaining the operation of the damper of the example shown in FIGS. 1 and 3.

With the pedal device 1, if the rotating member 28 is rotated in the R direction through the rotating shaft 14 by the rotation of the accelerator pedal arm 3 due to the pressing of the pedal, the projections 84 are also rotated in the R direction, and the movable member 23, which is integrally provided with the projections 86 with their inclined surfaces 85 brought into planar contact with the inclined surfaces 83, is moved toward the bottom portion 25 against the resiliency of the coil spring 27 in the direction of the axis A owing to the rotation in the R direction of the projections 84, as shown in FIG. 11. On the other hand, if the pressing of the pedal is canceled, the accelerator pedal arm 3 is returned to its original position by the resiliency of the coil spring 16, and the movable member 23 is similarly returned to its original position, as shown in FIG. 1.

With the pedal device 1, when the pedal is pressed down, an appropriate gradually increasing resisting force (reaction force) is imparted to the rotation of the accelerator pedal arm 3 based on the pressing of the pedal owing to the frictional resistance between the inclined surfaces 83 and the inclined surfaces 85 and the frictional resistance between the surface 87 and the fixed surface 88, which are pressed against each other by the gradually increasing resiliency of the coil spring 27. Thus, it is possible to avoid the excessive pressing of the accelerator pedal, which would consume fuel more than is necessary, and to avoid the risk of the occurrence of an accident due to out-of-control running. On the other hand, when the pressing of the pedal is canceled, the frictional resistance between the inclined surfaces 83 and the inclined surfaces 85, as well as the frictional resistance between the surface 87 and the fixed surface 88, become very small, and the accelerator pedal arm 3 is rotated and returned to its initial position at an early period with a small resisting force by the resiliency of the coil spring 16.

According to the pedal device 1, since the resisting force which can be imparted to the rotation of the accelerator pedal arm 3 can be substantially determined by the frictional resistance between the inclined surfaces 83 and the inclined surfaces 85 as well as the frictional resistance between the surface 87 and the fixed surface 88, the adjustment of reaction force can be effected very simply. Further, by appropriately setting the respective values, the pedal device 1 can be made very compact, and can be installed by making effective use of a small space.

According to the pedal device 1, since the bottom portion 25 of the hollow cylindrical member 22 is formed by the cover portion 36 which is threadedly engaged with the hollow cylindrical portion 31 in such a manner as to be capable of being adjustably positioned with respect to the direction of the axis A, the initial resiliency generated by the coil spring 27, i.e., the initial resisting force, can be arbitrarily adjusted and set, thereby making it possible to obtain an optimum initial resisting force.

According to the pedal device 1, since the coil spring 27 produces practically no returning force for returning the accelerator pedal arm 3 to the initial position, virtually no reaction force is produced in the accelerator pedal arm 3 during the constant-speed traveling. Therefore, there is a further advantage in that the foot which presses on the pedal does not experience early fatigue.

According to the pedal device 1, since the coil spring 27 is interposed between the movable member 23 and the bottom portion 25 of the hollow cylindrical member 22, which do not rotate relative to each other, the coil spring 27 is not twisted even when the rotating member 28 rotates, and such trouble as the faulty operation and the like due to the twisting of the coil spring 27 does not occur.

In the pedal device 1, the hollow cylindrical member 22 may be fixed to the accelerator pedal arm 3, and the rotating member 28 may be secured to the supporting frame 2.

Figure 12:
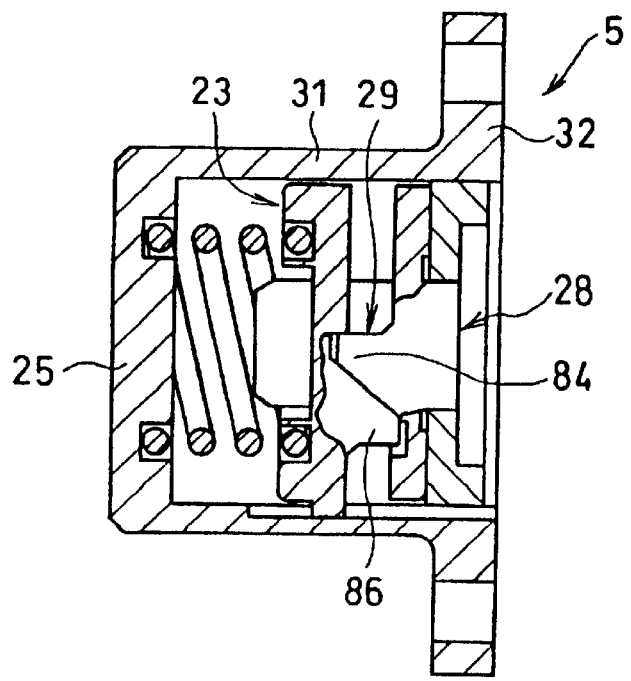
FIG. 12 is a cross-sectional view of another preferred example of the damper of the present invention.
Figure 13:
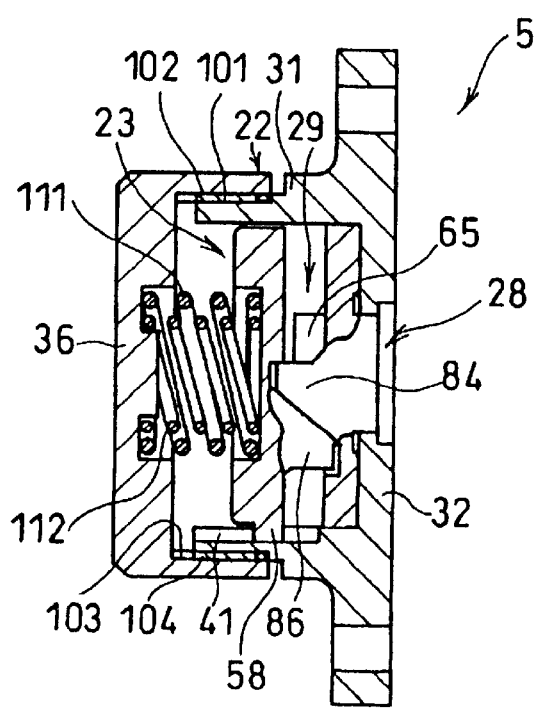
FIG. 13 is a cross-sectional view of still another preferred example of the damper of the present invention.

Although, in the above-described pedal device 1, the bottom portion 25 of the hollow cylindrical member 22 is formed by the cover portion 36 which is separate from the hollow cylindrical portion 31, but the hollow cylindrical portion 31 and the cover portion 36 may be formed integrally as shown in FIG. 12, or an arrangement may be provided such that, as shown in FIG. 13, a threaded portion 104 formed on an inner peripheral surface 103 of the cover portion 36 is threadedly engaged with a threaded portion 102 formed on an outer peripheral surface 101 of the hollow cylindrical portion 31, and the cover portion 36 is secured to the hollow cylindrical portion 31 in such a manner as to be capable of being adjustably positioned with respect to the direction of the axis A.

Although, in the above-described pedal device 1, the spring means interposed between the movable member 23 and the bottom portion 25 of the hollow cylindrical member 22 is formed by the single coil spring 27, the spring means may formed by at least two coil springs 111 and 112 which are arranged concentrically, as shown in FIG. 13, wherein, of these at least two coils springs 111 and 112, the modulus of elasticity of one coil spring 111 is made relatively large, while the modulus of elasticity of the other coil spring 112 is made relatively small, thereby varying their moduli of elasticity. A multiplicity of coil springs 112 having small but variously different moduli of elasticity are prepared in advance, and an appropriate one may be selected from among them, as required, so as to be used for the adjustment of the reaction force. In this case, the through hole 55 of the main body 56 of the movable member 23 may be omitted, and the hollow cylindrical portion 65 of the rotating member 28 may be formed to be short in the direction of the axis A so as not to penetrate the main body 56.

Figure 14:
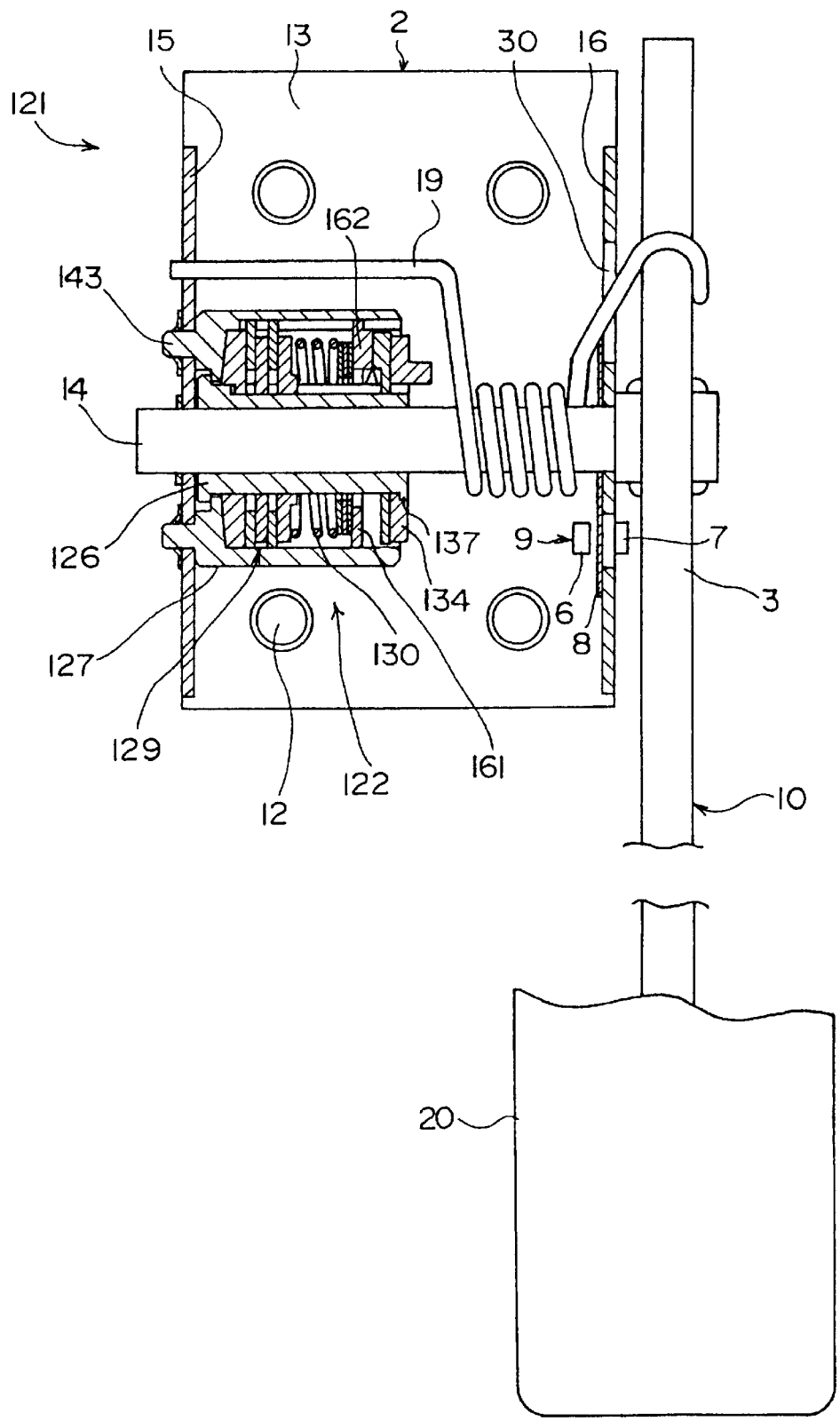
FIG. 14 is a front cross-sectional view of another preferred embodiment of the pedal device in accordance with the present invention.
Figure 15:
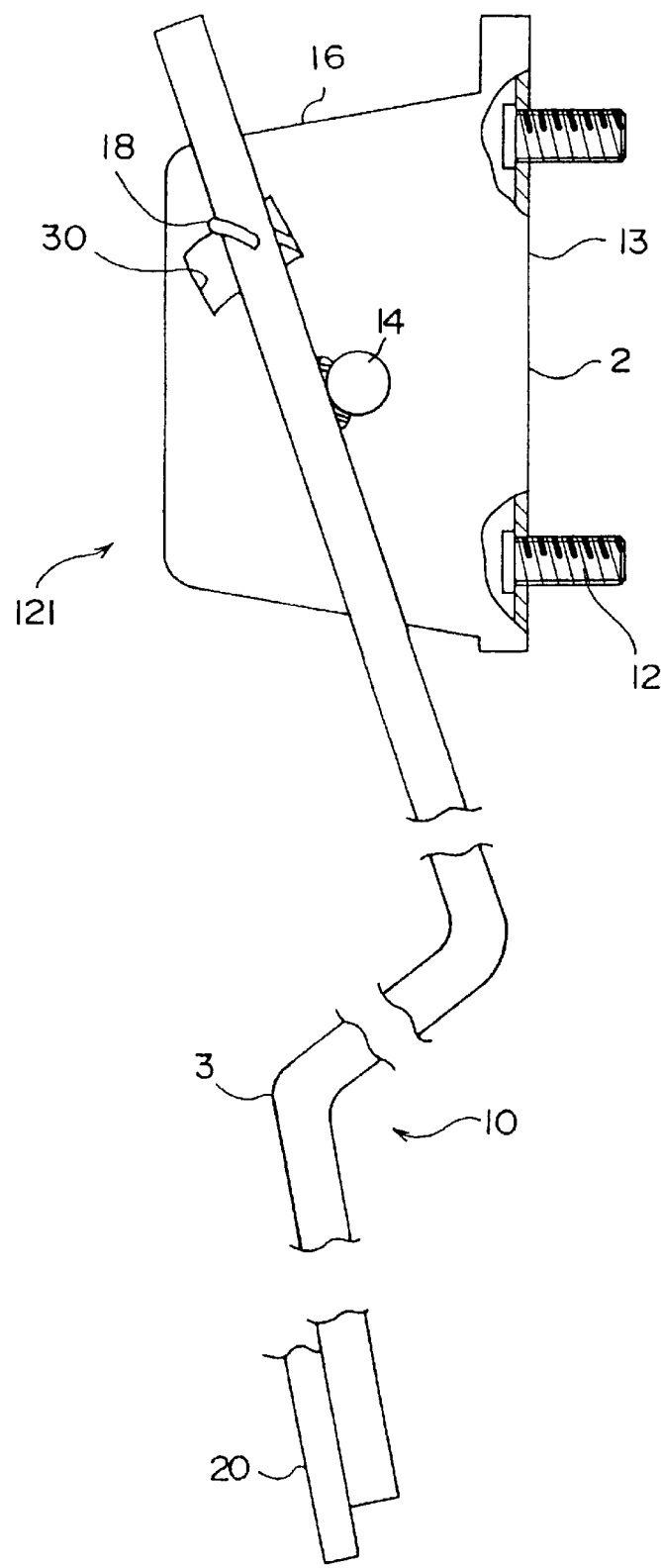
FIG. 15 is a right side view of the embodiment shown in FIG. 14.

Next, a description will be given of another embodiment of the accelerator pedal device in accordance with the present invention. In FIGS. 14 and 15, an accelerator pedal device 121 in this embodiment is comprised of, among others, the supporting frame 2 secured to the vehicle body side; the accelerator pedal 10 provided swingably on the supporting frame 2; the torsion coil spring 19 for upwardly urging the accelerator pedal 10; and a friction damper 122 disposed between the both side walls 15 and 16.

As shown in detail in FIGS. 16(A)–16(D) and 17, the friction damper 122 includes an inner member 126 extending like a shaft; a tubular outer member 127 disposed on the outer side of the inner member 126 concentrically therewith; a friction means 129 disposed in an annular space 128 on the radially outward side of the inner member 126 and on the radially inward side of the outer member 127; a coil spring 130 serving as a resilient means for urging the friction means 129 in the axial direction; a frictionally engaging means 131 for producing a torque by a frictional force; an urging-force varying means 132 for making the urging force of the coil spring 130 variable; at least one, in this embodiment three, washers 133 for setting an initial torque; and a retaining cap 134 serving as a restricting means.

A shaft inserting hole 135 extending in the axial direction is formed penetratingly in a central portion of the inner member 126, and the cross section of the hole 135 is identical to that of the rotating shaft 14, and has a shape in which a segment of a circle is cut off. As the rotating shaft 14 is inserted in the hole 135, the inner member 126 and the rotating shaft 14 are rotated as a unit.

A flange portion 136 protruding radially outward is formed at one axial end of the inner member 126, while four projections 137 projecting radially outward are formed at the other axial end thereof at equal intervals in the circumferential direction. Four recesses 138 extending in the axial direction and arranged at equal intervals in the circumferential direction are formed on an outer peripheral portion of the inner member 126 in such a manner as to be open at the aforementioned other end.

The outer member 127 has a hollow cylindrical portion 140 and a flange portion 141 formed at an axial end of the hollow cylindrical portion 140 in such a manner as to protrude radially inward.

Four recesses 142 extending in the axial direction and arranged at equal intervals in the circumferential direction are formed on an inner peripheral portion of the hollow cylindrical portion 140 in such a manner as to be open at one end of the hollow cylindrical portion 140. Two leg portions 143 projecting in the axial direction are formed on an outer end face of the flange portion 141. As shown in FIG. 14, the leg portions 143 are inserted in holes formed in the side wall 15, whereby the outer member 127 is attached to the side wall 15 in such a manner as to be unrotatable.

A through hole is formed in the center of the flange portion 141. In a state in which the inner member 126 is inserted into this hole and the flange portions 136 and 141 abut against each other, the inner member 126 extends concentrically on the inner side of the hollow cylindrical portion 140 of the outer member 127, and the annular space 128 is formed on the inner side of the hollow cylindrical portion 140 and on the outer side of the inner member 126.

As the outer member 127 is attached to the side wall 15 in such a manner as to be unrotatable, the flange portion 136 of the inner member 126 is located between the flange portion 141 of the outer member 127 and the side wall 15, as shown in FIG. 14. As a result, the inner member 126 is disposed in such a manner as to be axially immovable, i.e., in such a manner as to be axially immovable relative to the outer member 127.

The friction means 129 disposed in the annular space 128 in this embodiment has first to fifth, i.e., five kinds of, friction plates 151, 152, 153, 154, and 155.

These friction plates 151 to 155 are formed in the shape of annular plates, the inner member 126 is inserted in their central holes, the friction plates 151 to 155 are arranged in the annular space 128 in that order, and the friction plates 152 and 154 are formed by friction plates of the same configuration.

Four projections 156 are formed on inner peripheral portions at the central holes of the friction plates 151, 153, and 155 at equal intervals in the circumferential direction, and four recesses 157 are respectively formed between adjacent ones of the projections 156. In the state in which the inner member 126 is inserted in the central holes of the friction plates 151, 153, and 155, the projections 156 are engaged in the recesses 138 of the inner member 126, with the result that the friction plates 151, 153, and 155 are adapted to rotate integrally with the inner member 126. The recesses 157 are formed to allow the projections 137 of the inner member 126 to pass therethrough when the friction plates 151, 153, and 155 are fitted to the outer periphery of the inner member 126.

Four projections 158 are formed on outer peripheries of the friction plates 152 and 154 at equal intervals in the circumferential direction. In the state in which the inner member 126 is inserted in the outer member 127, the projections 158 are engaged in the recesses 142 of the outer member 127, whereby the friction plates 152 and 154 are joined to the outer member 127 so as to rotate integrally therewith. In this embodiment, however, since the outer member 127 is attached to the side wall 15 in such a manner as to be unrotatable, the friction plates 152 and 154 do not rotate, and remain stationary integrally with the outer member 127.

The friction plates 151 to 155 of the friction means 129 are set in the state of being pressed against the flange portion 141 by the coil spring 130, as will be described later. As the inner member 126 rotates, the friction plates 151, 153, and 155 rotate relative to the flange portion 141 and the friction plates 152 and 154, the friction means 129 generates a frictional force by the rotation of the inner member 126, thereby causing the frictionally resisting torque to be generated in the friction damper 122. In this embodiment, the frictionally engaging means 131 is formed by the flange portions 136 and 141 and the friction means 129.

The friction plates 151 to 155 are formed of, for example, a thermoplastic resin composition. The thermoplastic resin composition is composed of a base resin, as well as a first additive and a second additive which are added to the base resin. The base resin is a polyacetal resin or a polyphenylene sulfide resin. As the first additive, at least one kind is selected from an olefin-based polymer, a styrene-based polymer, and a fluorine-based polymer. As the second additive, at least one kind is selected from lubricating oil, wax, a fatty acid, graphite, molybdenum disulfide, and phosphate.

As the polyacetal resin, in addition to a polyacetal homopolyer, it is possible to use a polyacetal copolymer in which a major portion of its principal chain consists of an oxymethylene chain. Further, it is possible to use a resin which is modified by crosslinking or graft-copolymerizing a polyacetal in a known method.

Specifically, it is possible to cite a homopolymer "DELRIN (tradename)" made by E. I. Du Pont de nemours & Co., and a copolymer "Duracon (tradename)" made by POLYPLASTICS CO., LTD.

As the polyphenylene sulfide resin, it is possible to use either a crosslinked type or a straight chain type. Specifically, it is possible to cite "RYTON (tradename)" made by Phillips Petroleum International Ltd., "TOHPREN PPS (tradename)" made by TOHPREN CO., LTD., and "FORTRON (tradename)" made by Kureha Chemical Industry Co., Ltd.

The first additive is used to improve the sliding characteristic of the base resin. As the first additive, at least one kind selected from an olefin-based polymer, a styrene-based polymer, and a fluorine-based polymer is added. As the olefin-based polymers, it is possible to cite a homopolymer such as polyethylene and polypropylene and a copolymer containing them as principal constituents. As the copolymers, it is possible to cite an ethylene-a-olefin copolymer, an ethylene-propylene-diene copolymer, an ethylene-vinyl acetate copolymer, an ethylene-ethyl acrylate copolymer, an ethylene-glycidyl methacrylate copolymer, an ethylene-ethyl acrylate-maleic anhydride copolymer, and the like. Further, a copolymer in which polystyrene, polymethyl methacrylate, or an acrylonitrile-styrene copolymer is grafted to the homopolymer or the copolymer is also included. The olefin-based polymer is used singly or in the form of a mixture or a reaction product of two or more kinds. The styrene-based polymer is a triblock copolymer or a radial block copolymer having a polystyrene-rubbery intermediate block-polystyrene structure. As the rubbery intermediate blocks, it is possible to cite polybutadiene, polyisoprene, and hydrogenated compounds thereof.

As the block copolymers, it is possible to specifically cite a polystyrene-polybutadiene-polystyrene block copolymer, a polystyrene-polyisoprene-polystyrene block copolymer, a polystyrene-poly(ethylene/butylene)-polystyrene block copolymer, and a polystyrene-poly(ethylene/propylene) polystyrene block copolymer.

Further, in the present invention, it is possible to use the aforementioned block copolymers into which functional groups are introduced. As the functional groups which are introduced, it is possible to cite maleic acid, endocis-dicyclo[2,2,1]hepto-5-en-2,3-dicarboxylic acid (nadic acid), maleic anhydride, citraconic anhydride, itaconic anhydride, tetrahydrophthalic anhydride, nadic anhydride, nadic methyl anhydride, monomethyl maleate, dimethyl maleate, dimethyl itaconate, dimethyl citraconate, maleimide, a graft monomer of malenyl chloride, and the like. In particular, maleic acid, nadic acid, or an acid anhydride thereof is preferable.

As the fluorine-based polymers, it is possible to cite polytetrafluoroethylene, a tetrafluoroethylene-perfluoroalkylvinyl ether copolymer, a tetrafluoroethylene-hexafluoropropylene copolymer, a tetrafluoroethylene-ethylene copolymer, polychlorotrifluoroethylene, a chlorotrifluoroethylene-ethylene copolymer, polyvinylidene fluoride, polyvinylfluoride, and the like.

The amount of compounding of the first additive is 0.3 to 10 wt. % in the case of the olefin-based polymer, preferably 0.5 to 7 wt. %; 0.1 to 10 wt. % in the case of the styrene-based polymer, preferably 0.3 to 6 wt. %; and 2 to 50 wt. % in the case of the fluorine-based polymer, preferably 2 to 40 wt. %.

The second additive is used by being added to the first additive so as to further improve the sliding characteristic. As the second additives, at least one kind selected from lubricating oil, wax, a fatty acid, graphite, molybdenum disulfide, and phosphate is added. As the lubricating oils, it is possible to cite mineral oils including engine oil, spindle oil, turbine oil, machine oil, cylinder oil, gear oil, and the like; a vegetable oil such as castor oil; an animal oil such as whale oil; and a synthetic oil such as silicone oil. As waxes, it is possible to cite, in addition to paraffin wax, a fatty acid ester, a fatty acid amide, and a fatty acid salt derived from a higher fatty acid, and the like.

As the phosphates, it is possible to cite a tribasic phosphate, a dibasic phosphate, a pyrophosphate, a phosphite, and a metaphosphate of an alkaline metal or an alkaline earth metal. Specifically, it is possible to cite tribasic lithium phosphate ($Li_3PO_4$), dibasic lithium phosphate ($Li_2HPO_4$), lithium pyrophosphate ($Li_4P_2O_7$), tribasic calcium phosphate ($Ca_3(PO_4)_2$), dibasic calcium phosphate ($CaHPO_4$ or $CaHPO_4 \Sigma\ 2H_2O$), and calcium pyrophosphate ($Ca_2P_2O_7$).

The amount of compounding of the second additive is 0.1 to 10 wt. %, preferably 0.3 to 6 wt. %.

In addition, a third additive may be additionally used for the purpose of reinforcing the thermoplastic resin composition. As the third additive, at least one kind selected from a glass powder, a carbon powder (excluding graphite), a glass fiber, a carbon fiber, an aramid fiber, potassium titanate whiskers, a metal fiber, a metal powder, and the like is compounded in a proportion of 10 wt. % or less.

After the friction plates 151 to 155 are disposed in the annular space 128 in that order, the coil spring 130 is disposed in such a manner as to oppose the friction plate 155, the washers 133 and the urging-force varying means 132 are then disposed, and the retaining cap 134 is finally disposed.

As for the coil spring 130, its material, wire diameter, coil diameter, and the number of turns are determined so that a desired hysteresis can be obtained.

The urging-force varying means 132 is formed of a pair of mutually opposing variable plates 161 and 162, and are both formed in the shape of annular plates.

Four projections 163 projecting radially outward are formed on an outer periphery of the variable plate 161, serving as an outer variable member, in such a manner as to be arranged at equal intervals in the circumferential direction, and the projections 163 are engaged in the recesses 142 of the outer member 127, so that the variable plate 161 is joined to the outer member 127 so as to rotate integrally therewith. In this embodiment, however, since the outer member 127 is attached to the side wall 15 in such a manner as to be unrotatable, the variable plate 161 also does not rotate, and remains stationary integrally with the outer member 127.

Four projections 164 projecting radially inward are formed on an inner periphery of the variable plate 162, serving as an inner variable member, in such a manner as to be arranged at equal intervals in the circumferential direction, and the projections 164 are engaged in the recesses 138 of the inner member 126, so that the variable plate 162 rotates integrally with the inner member 126.

As shown in FIGS. 18(A) and 18(B), cam portions 165 and 166 capable of engaging each other are respectively formed on outer peripheries of mutually opposing surfaces of the variable plates 161 and 162. Each of the cam portions 165 and 166 has a proximal portion 167, a projecting portion 168 projecting from the proximal portion 167, and an inclined portion 169 connecting the proximal portion 167 and the projecting portion 168.

Four recesses 171 which are recessed radially outward are formed on an inner periphery of the retaining cap 134, which is formed in the shape of an annular plate, in such a manner as to be arranged at equal intervals in the circumferential direction, and the projections 137 of the inner member 126 are inserted in the recesses 171.

Two projections 172 projecting in the axial direction are formed on an end face of the retaining cap 134 at diametrically opposing positions thereof, and four notches 173 are formed adjacent to the recesses 171, respectively. The projections 172 are designed to facilitate the operation when the retaining cap 134 is attached or detached.

In assembly, after the friction plates 151 to 155, the coil spring 130, the washers 133, and the variable plates 161 and 162 are disposed in the annular space 128 in that order, the retaining cap 134 is disposed. Subsequently, the retaining cap 134 is rotated by using the projections 172, and the projections 137 of the inner member 126 are engaged in the notches 173 in a snap-fitting manner, thereby attaching the retaining cap 134 to the inner member 126 in such a manner as to be incapable of coming off. Thus, the retaining cap 134 is secured to the inner member 126 so as to rotate integrally with the inner member 126.

It should be noted that, as for the structure for attaching the retaining cap 134 to the inner member 126 in such a manner as to be incapable of coming off, an arrangement may be provided as shown in FIG. 19, wherein an internal thread is formed on the inner periphery of the retaining cap 134, while an external thread is formed at a distal end of the inner member 126, so as to make use of threaded engagement 174 between the internal thread and the external thread.

Figure 16:
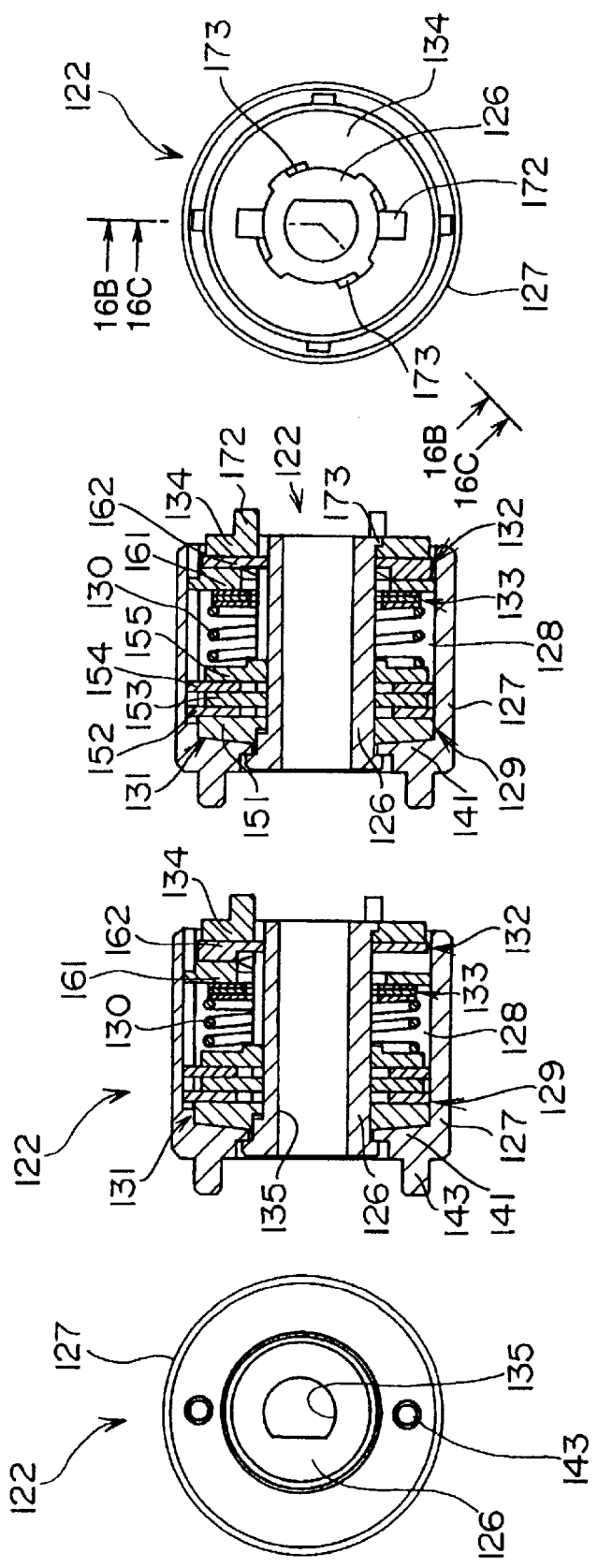
FIG. 16(A) is a left end face view of the friction damper shown in FIG. 14.
FIG. 16(B) is cross-sectional view, taken along line 16(B)—16(B) of FIG. 16(D), of the friction damper in a state in which a coil spring has been compressed after the pressing down of an accelerator pedal of the embodiment shown in FIG. 14.
FIG. 16(C) is a cross-sectional view, taken along line 16(C)—16(C) of FIG. 16(D), of the friction damper in a state in which the coil spring is not compressed with the foot removed from the accelerator pedal of the embodiment shown in FIG. 14.
FIG. 16(D) is a right end face view of the friction damper shown in FIG. 14.
Figure 17:
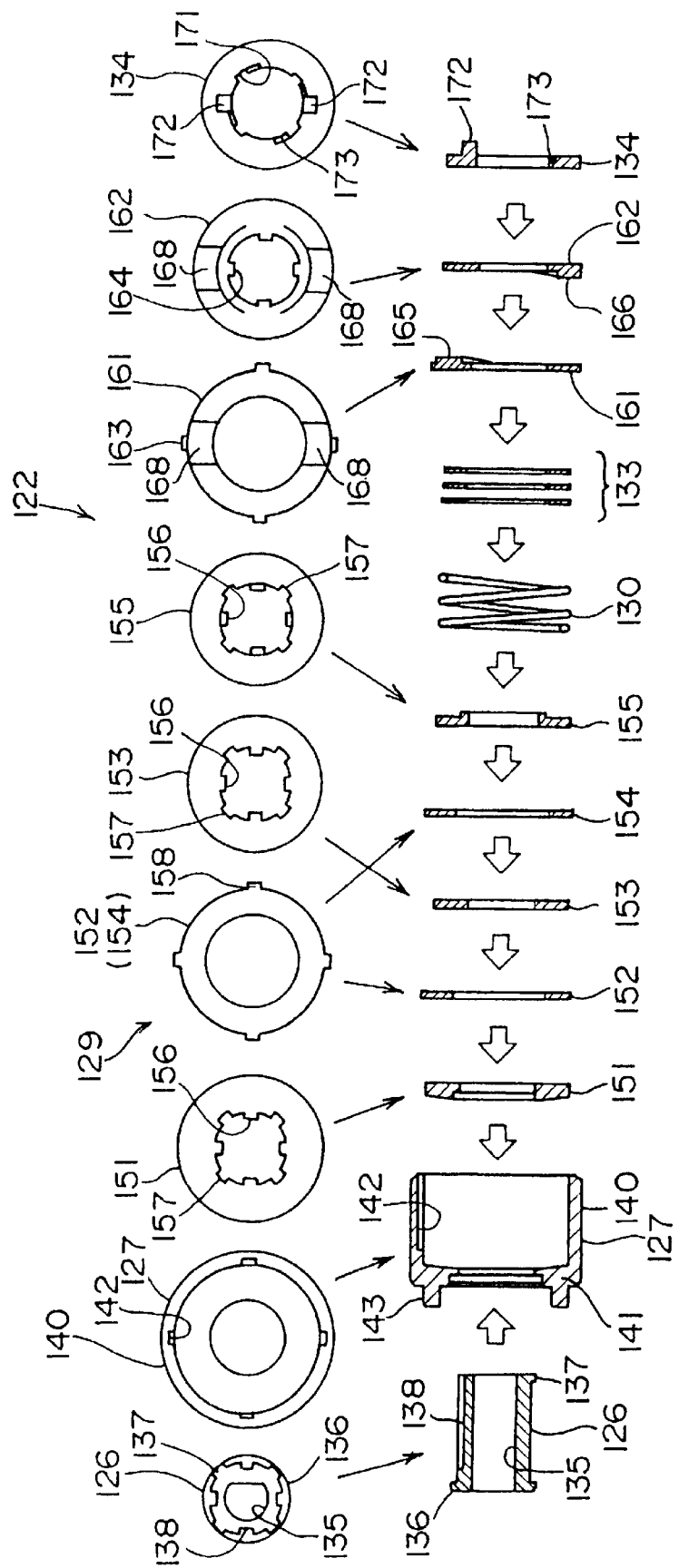
FIG. 17 is an explanatory diagram of members composing the friction damper of the embodiment shown in FIG. 14, an upper row of the drawings being side views of the respective members and a lower row of the drawings being cross-sectional views or a front view.

With the accelerator pedal device 121 in this embodiment, in a state in which the foot is removed from the pedal 20, the pedal 20 is at an upper-limit position, and the friction damper 122 is in the state shown in FIG. 16(C).

Namely, the projecting portions 168 of the cam portions 165 of the variable plate 161 abut against the proximal portions 167 of the cam portions 166 of the variable plate 162, while the projecting portions 168 of the cam portions 166 of the variable plate 162 abut against the proximal portions 167 of the cam portions 165 of the variable plate 161. In this state, the axial dimension between the variable plate 161 and the flange portion 141 is maximum, and the axial dimension of the space in which the coil spring 130 is accommodated in the annular space 128 is maximum.

When the accelerator pedal 10 is pressed down, in this state the rotating shaft 14 starts to rotate, and the inner member 126 starts to rotate. The initial rotation-resisting torque occurring in the frictional means 129 at this time can be adjusted simply by changing the number of the washers 133 or by changing the washers 133 to those having different thicknesses.

Next, if the accelerator pedal 10 is pressed down, a resisting torque of a value in which the resiliently resisting torque generated by the resiliency of the torsion coil spring 19 and the frictionally resisting torque generated by the friction damper 122 are added together is applied to the foot as a load.

In this case, the resisting torque generated by the friction damper 122 is constant while the projecting portions 168 of the cam portions 165 of the variable plate 161 abut against the proximal portions 167 of the cam portions 166 of the variable plate 162, and the projecting portions 168 of the cam portions 166 of the variable plate 162 abut against the proximal portions 167 of the cam portions 165 of the variable plate 161.

When the accelerator pedal 10 is further pressed down, and when the projecting portions 168 of the cam portions 165 of the variable plate 161 abut against the inclined portions 169 of the cam portions 166 of the variable plate 162, and the projecting portions 168 of the cam portions 166 of the variable plate 162 abut against the inclined portions 169 of the cam portions 165 of the variable plate 161, the axial dimension between the variable plate 161 and the flange portion 141 becomes smaller by following the amount of the accelerator pedal 10 pressed. This, in turn, causes the coil spring 130 to be compressed, and increases the force with which the friction means 129 is pressed, so that the rotation-resisting torque generated by the friction damper 122 becomes gradually larger.

Then, a resisting torque of a value in which the reaction torque generated by the resiliency of the torsion coil spring 19 and the gradually increasing frictional torque generated by the friction damper 122 are added together is applied to the foot as the load.

When the accelerator pedal 10 is further pressed down and reaches a lower-limit position, as shown in FIG. 16(B), the projecting portions 168 of the cam portions 165 of the variable plate 161 abut against the projecting portions 168 of the cam portions 166 of the variable plate 162, and the projecting portions 168 of the cam portions 166 of the variable plate 162 abut against the projecting portions 168 of the cam portions 165 of the variable plate 161. Hence, the axial dimension between the variable plate 161 and the flange portion 141 becomes minimum, and the axial dimension of the space for accommodating the coil spring 130 in the annular space 128 becomes minimum. As a result, the amount of the coil spring 130 compressed becomes maximum, and the force for pressing the friction means 129 becomes maximum, so that the frictional torque generated by the friction damper 122 becomes maximum.

Thus, in this embodiment, if the accelerator pedal 10 is pressed down, a resisting torque of a value in which the rotational torque generated by the resiliency of the torsion coil spring 19 and the maximum torque generated by the friction damper 122 are added together is applied to the foot as the load at the lower-limit position of the pedal 20.

In this embodiment, the initial frictionally-resisting torque of the friction damper 122 can be adjusted simply by changing the number of the washers 133 or by changing the washers 133 to those having different thicknesses.

The torque occurring in the friction damper 122 can be simply adjusted to a desired value by appropriately selecting the material, wire diameter, coil diameter, and the number of turns of the coil spring 130 and the material of the friction plates 151 to 155 of the friction means 129.

Further, the timing at which the torque occurring in the friction damper 122 is increased or decreased, as well as the rate at which that torque is increased or decreased, can also be simply adjusted to desired values by changing the configurations of the cam portions 165 and 166.

For these reasons, the load applied to the foot, i.e., the torque of a value in which the reaction torque generated by the resiliency of the torsion coil spring 19 and the frictionally resisting torque generated by the friction damper 122 are added together, and hence its hysteresis characteristic can be simply set to desired values.

Accordingly, in accordance with this embodiment, even if a conventional accelerator wire cable for linking the accelerator pedal 10 and the throttle or the accelerator pedal 10 and the fuel injector is omitted, the same load as in the case where that cable is used can be simply imparted to the foot, and the accelerator pedal device 121 can be arranged by using the angle detector, the electronic controller, and the actuator.

Then, as the accelerator wire cable is omitted, the arrangement around the accelerator pedal 10, particularly around the supporting frame 2, can be made compact.

Referring now to FIGS. 20(A), 20(B), 20(C) and 21, a description will be given of still another embodiment of the friction damper which can be applied to the accelerator pedal device for an automobile in the same way as the foregoing embodiments.

A friction damper 201 shown in FIGS. 20(A), 20(B), 20(C) and 21 is comprised of, among others, an inner member 202 extending like a shaft; a tubular outer member 203 disposed on the outer side of the inner member 202 concentrically therewith; a frictionally engaging means 205 disposed in an annular space 204 on the radially outward side of the inner member 202 and on the radially inward side of the outer member 203; a coil spring 206 serving as a resilient means for pressing the frictionally engaging means 205; an urging-force varying means 207 for making the pressing force of the coil spring 206 variable; three washers 208 for setting an initial torque; and a retaining cap 209.

A shaft inserting hole 211 extending in the axial direction is formed penetratingly in a central portion of the inner member 202. In the same way as in the above-described embodiment, the cross section of the hole 211 is identical to that of the rotating shaft 14, and as the rotating shaft 14 is inserted in the hole 211, the inner member 202 and the rotating shaft 14 are rotated as a unit.

A flange portion 212 protruding radially outward is formed integrally at one axial end of the inner member 202, while four recesses 223 extending in the axial direction and arranged at equal intervals in the circumferential direction are formed at the other axial end of the inner member 202 in such a manner as to be open at that end.

The outer member 203 has a hollow cylindrical portion 221 and a flange portion 222 formed at an axial end of the hollow cylindrical portion 221 in such a manner as to protrude radially inward. In this embodiment, the frictionally engaging means 205 is formed by the flange portion 222 and the flange portion 212 of the inner member 202.

An internal thread 231 is formed on an inner peripheral surface of the hollow cylindrical portion 221. Two leg portions 224 which are inserted and fixed in holes formed in the side wall 15 are formed at the outer end face of the flange portion 222 in the same way as in the above-described embodiment.

A through hole is formed in the center of the flange portion 222. In a state in which the inner member 202 is inserted into this hole and the flange portions 212 and 222 abut against each other, the inner member 202 extends concentrically on the inner side of the hollow cylindrical portion 221 of the outer member 203, and the annular space 204 is formed on the inner side of the hollow cylindrical portion 221 and on the outer side of the inner member 202.

A retaining ring 225 is attached to a tip of the inner member 202 projecting from hole in the center of the flange portion 222. As the flange portion 222 of the outer member 203 is clamped by the retaining ring 225 and the flange portion 212, the inner member 202 is disposed in such a manner as to be slightly movable in the axial direction. i.e., in such a manner as to be slightly axially movable relative to the outer member 203.

The friction damper 201 does not employ friction plates formed separately from the inner member 202 and the outer member 203 used in the above-described embodiment, and the flange portions 212 and 222 correspond to the friction plates in the above-described embodiment. These flange portions 212 and 222 are set in a state of being pressed against each other by the coil spring 206, as is described later, and as the inner member 202 rotates, the flange portion 212 rotates relative to the flange portion 222. As a result, a frictional force is produced between the flange portions 212 and 222, thereby causing a frictional torque to be generated in the friction damper 201. As the material of the flange portions 212 and 222, it is possible to use the same material as that for the friction plates in the foregoing embodiment.

As for the coil spring 206, its material, wire diameter, coil diameter, and the number of turns are determined so that a desired hysteresis characteristic can be obtained concerning the frictional torque.

An external thread 213 is formed on the outer periphery of the retaining cap 209 which is formed in a tubular shape, while four projections 232 projecting radially inward are formed on an inner peripheral portion of the retaining cap 209 at equal intervals in the circumferential direction. The projections 232 are engaged in the recesses 223 of the inner member 202, and the retaining cap 209 is joined to the inner member 202 so as to rotate integrally therewith.

Two projections 233 projecting in the axial direction are formed at an end face of the retaining cap 209 at equal intervals in the circumferential direction. The projections 233 are designed to facilitate the operation when the retaining cap 209 is attached or detached.

In assembly, the coil spring 206, the washers 208, and the retaining cap 209 are fitted around the inner member 202. Then, this subassembly is inserted into the outer member 203 such that the external thread 213 is threadedly engaged in the internal thread 231, and after the insertion, the retaining ring 225 is fitted to the tip of the inner member 202 projecting from the hole in the center of the flange portion 222.

Figure 20C:
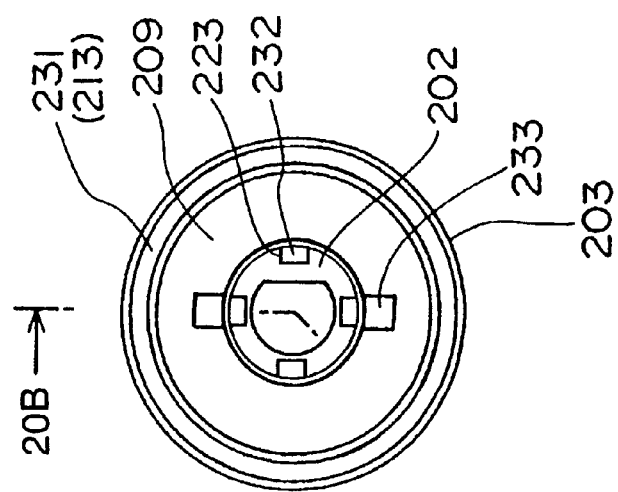
FIG. 20(C) is a right end face view of the still other embodiment of the friction damper.
Figure 20B:
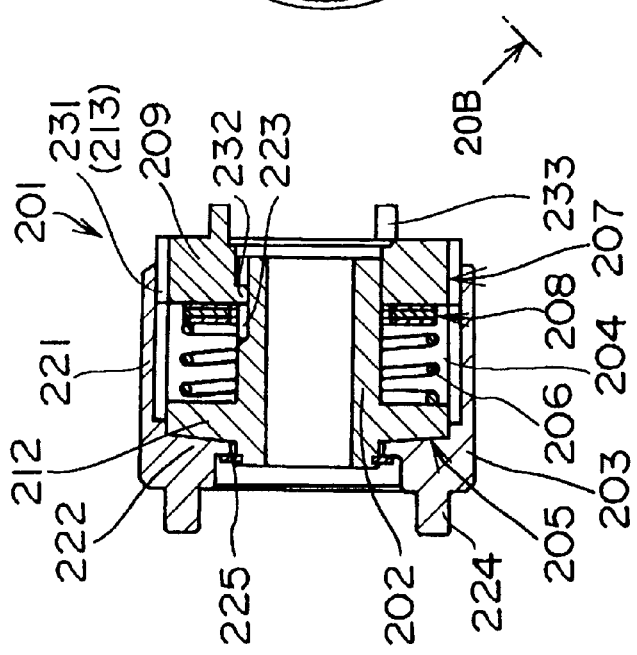
FIG. 20(B) is a cross-sectional view, taken along line 20(B)—20(B) of FIG. 20(C), of the still other embodiment of the friction damper in a state in which the coil spring is not compressed with the foot removed from the accelerator pedal.
Figure 20A:
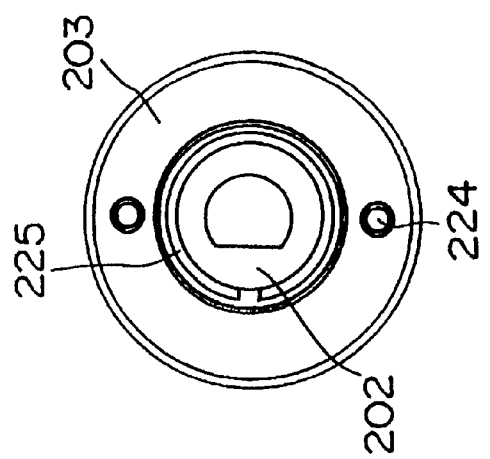
FIG. 20(A) is a left end face view of still another embodiment of the friction damper.
Figure 21:
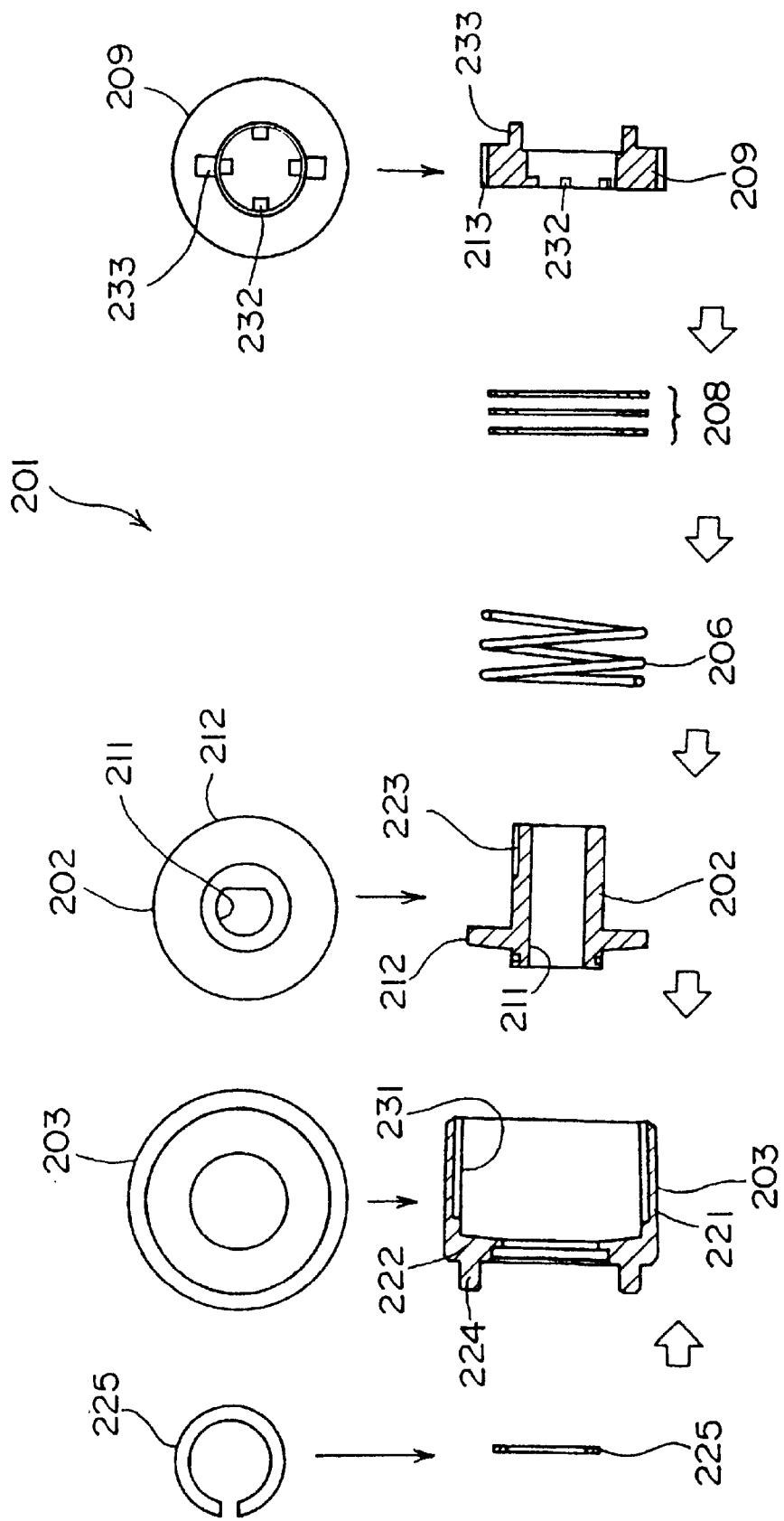
FIG. 21 is an explanatory diagram of members composing the friction damper of the embodiment shown in FIG. 20, an upper row of the drawings being side views of the respective members and a lower row of the drawings being cross-sectional views or a front view.

With the friction damper 201, in the state in which the foot is removed from the accelerator pedal 10, the pedal 20 is at the upper-limit position, and the friction damper 201 is in the state shown in FIG. 20(B). In this state, the axial dimension between the flange portion 222 of the outer member 203 and the retaining cap 209 becomes maximum, and the flange portion 222 of the outer member 203 and the flange portion 212 of the inner member 202 are pressed and abutted against each other by the coil spring 206.

When the accelerator pedal 10 is pressed down, the rotating shaft 14 starts to rotate, and the inner member 202 starts to rotate. The initial frictional torque occurring between the flanges 212 and 222 at this time can be adjusted simply by changing the number of the washers 208 or by changing the washers 208 to those having different thicknesses.

Next, when the accelerator pedal 10 is pressed down, a torque of a value in which the resilient reaction torque generated by the resiliency of the torsion coil spring 19 and the frictionally resisting torque generated in the friction damper 201 are added together is applied to the foot as the load.

In this case, since the retaining cap 209 is threadedly engaged with the outer member 203 by means of the internal thread 231 and the external thread 213, and is joined to the inner member 202 through the engagement between the projections 232 and the recesses 223 in such a manner as to be unrotatable, the retaining cap 209 moves in the direction of approaching the flange portion 222 of the outer member 203, by following the rotation of the rotating shaft 14 and the inner member 202 based on the pressing down of the accelerator pedal 10. As a result, the axial dimension between the flange portion 222 of the outer member 203 and the retaining cap 209 becomes smaller, so that the coil spring 206 is compressed, and the force with which the flange portions 212 and 222 are pressed against each other increases. Consequently, the frictional torque generated by the friction damper 201 becomes gradually larger. In the friction damper 201, the urging-force varying means 207 is formed by the retaining cap 209, the internal thread 231, the external thread 213, the projections 232, and the recesses 223.

Thus, also with the accelerator pedal device having the friction damper 201, when the accelerator pedal 10 is pressed down, the torque of a value in which the reaction torque generated by the resiliency of the torsion coil spring 19 and the gradually increasing frictional torque generated in the friction damper 201 are added together is applied to the foot as the load.

The frictional torque occurring in the friction damper 201 can be simply adjusted to a desired value by appropriately selecting the material, wire diameter, coil diameter, and the number of turns of the coil spring 206 and the material of the flange portions 212 and 222. Further, the rate at which the torque occurring in the friction damper 201 increases in correspondence with the rotational displacement of the inner member 202 can also be simply adjusted to a desired rate by changing the pitches of the internal thread 231 and the external thread 213.

From these reasons, also with the accelerator pedal device having the friction damper 201, the load applied to the foot, i.e., the torque of a value in which the torque generated by the resiliency of the torsion coil spring 19 and the torque generated by the friction damper 201 are added together, and hence the hysteresis characteristic concerning the torque can be simply set to desired values.

Accordingly, in accordance with this embodiment as well, even if the conventional accelerator wire cable for linking the accelerator pedal and the throttle or the accelerator pedal and the fuel injector is omitted, the same load as in the case where that cable is used can be simply imparted to the foot, and the accelerator pedal device can be arranged by using the angle detector, the electronic controller, and the actuator.

Then, as the accelerator wire cable is omitted, the arrangement around the accelerator pedal 10, particularly around the supporting frame 2, can be made compact.

Figure 22:
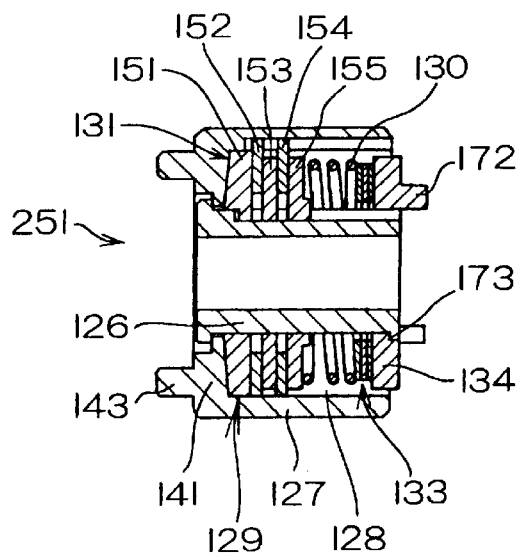
FIG. 22 is a cross-sectional view of a further embodiment of the friction damper.

Referring next to FIG. 22, a description will be given of a further embodiment of the friction damper which can be applied to the accelerator pedal device.

In a friction damper 251 in the embodiment shown in FIG. 22, the urging-force varying means 132 is omitted from the friction damper 122, and the other arrangement is similar to that of the friction damper 122, the operation being effected in the same way as in the friction damper 122 by excluding the operation of the urging-force varying means 132. The friction damper 251 which does not have the urging-force varying means 132 differs from the friction damper 122 in which the frictionally resisting torque occurring due to the amount of the accelerator pedal 10 pressed changes, in that a fixed frictionally resisting torque is produced irrespective of the amount of the accelerator pedal 10 pressed.

Figure 23:
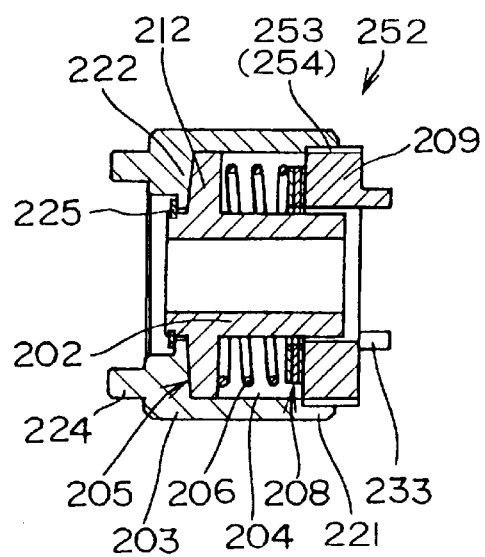
FIG. 23 is a cross-sectional view of a still further embodiment of the friction damper.

FIG. 23 shows a still further embodiment of the friction damper in which the produced torque is fixed irrespective of the amount of the accelerator pedal 10 pressed, in the same way as the friction damper 251.

A friction damper 252 shown in FIG. 23 is arranged such that, in the friction damper 201 shown in FIG. 20, an external thread 253 is formed on an outer peripheral portion of the retaining cap 209, an internal thread 254 is formed on an inner peripheral portion of the hollow cylindrical portion 221 of the outer member 203 in the friction damper 201 shown in FIG. 20, and the retaining cap 209 is secured to the hollow cylindrical portion 221 of the outer member 203 through the threaded engagement between the external thread 253 and the internal thread 254.

It should be noted that, in the friction damper 252, it is unnecessary to form the recesses 223 on the inner peripheral portion of the hollow cylindrical portion 221 of the outer member 203, the internal thread 231 on the outer peripheral portion of the inner member 202, and the external thread 213 on the inner peripheral portion of the retaining cap 209, respectively.

With the friction damper 252 shown in FIG. 23, when the accelerator pedal 10 is pressed down, the retaining cap 209 does not move in the axial direction, so that a fixed frictionally resisting torque is generated irrespective of the amount of the accelerator pedal 10 pressed.

Although, in the foregoing embodiments, a description has been given of cases where the friction damper is applied to the accelerator pedal device, the friction damper in accordance with the present invention is not limited to the accelerator pedal device, and is also applicable to a device for which the value of torque is to be changed in correspondence with a relative rotational displacement.

What is claimed is:

1. A damper comprising:
   a hollow cylindrical member with a bottom and a hollow cylindrical portion, which has on an inner peripheral surface thereof a groove extending in an axial direction of the hollow cylindrical member;
   a movable member disposed in said hollow cylindrical member, said movable member having a main body and a projection on an outer peripheral surface of said main body, said projection engaging in said groove with said hollow cylindrical portion in such a manner that said movable member is movable in said axial direction but immovable about an axis of said hollow cylindrical member;
   a spring means disposed between said movable member and the bottom of said hollow cylindrical member, one end of said spring means abutting against the bottom of said hollow cylindrical member and another end thereof abutting against said movable member;

a rotating member disposed in said hollow cylindrical member in such a manner as to oppose said movable member and to be relatively rotating about the axis of said hollow cylindrical member; and a frictionally-resisting-force generating means for generating a frictionally resisting force to the relative rotation of said rotating member with respect to said hollow cylindrical member, and for causing said movable member to move away from said rotating member in the axial direction against the resiliency of said spring means and to approach the bottom of said hollow cylindrical member so as to increase the spring force of said spring means, thereby increasing the frictionally resisting force.

2. A pedal device for a vehicle, comprising:

a pedal arm which is rotatably supported by a supporting frame;

a first spring means for rotatively urging said pedal arm to an initial position of its rotation; and a damper for imparting a resisting force to the rotation of said pedal arm;

said damper including:
 a hollow cylindrical member with a bottom and a hollow cylindrical portion, which has on an inner peripheral surface thereof a groove extending in an axial direction of the hollow cylindrical member;
 a movable member disposed in said hollow cylindrical member, said movable member having a main body and a projection on an outer peripheral surface of said main body, said projection engaging in said groove with said hollow cylindrical portion in such a manner that said movable member is movable in said axial direction but immovable about an axis of said hollow cylindrical member;
 a second spring means disposed between said movable member and the bottom of said hollow cylindrical member, one end of said spring means abutting against the bottom of said hollow cylindrical member and another end thereof abutting against said movable member;
 a rotating member disposed in said hollow cylindrical member in such a manner as to oppose said movable member and to be relatively rotating about the axis of said hollow cylindrical member; and
 a frictionally-resisting-force generating means for generating a frictionally resisting force as the resisting force to the relative rotation of said rotating member with respect to said hollow cylindrical member, and for causing said movable member to move away from said rotating member in the axial direction against the resiliency of said second spring means and to approach the bottom of said hollow cylindrical member so as to increase the spring force of said second spring means, thereby increasing the frictionally resisting force;
 the rotation of said pedal arm being transmitted as the relative rotation of said hollow cylindrical member and said rotating member.

3. The pedal device for a vehicle according to claim 2, wherein said frictionally-resisting-force generating means has a fixed surface which comes into planar contact with a surface of said rotating member.

4. The pedal device for a vehicle according to claim 3, wherein said fixed surface is formed on said hollow cylindrical member.

5. The pedal device for a vehicle according to claim 2, wherein said frictionally-resisting-force generating means has a projection formed integrally on one surface of said rotating member, opposing said movable member, in such a manner as to project in the axial direction toward one surface of said movable member and a projection formed integrally on the one surface of said movable member, opposing said rotating member, in such a manner as to project in the axial direction toward the one surface of said rotating member, said projections being arranged to come into planar contact with each other.

6. The pedal device for a vehicle according to claim 2, wherein said pedal arm is an accelerator pedal arm.

7. The pedal device for a vehicle according to claim 2, wherein said frictionally-resisting-force generating means has an inclined surface on one surface of said rotating member opposing said movable member, and an inclined surface on one surface of said movable member opposing said rotating member and arranged to come into planar contact with said inclined surface on the one surface of said rotating member.

8. A pedal device comprising:

a rotating shaft supported by a supporting frame;

an accelerator pedal which is disposed at an upper-limit position where said accelerator pedal can be pressed down and which swings about said rotating shaft;

a resisting means for generating resistance in a direction in which the pressing down of said accelerator pedal is hampered when said accelerator pedal is pressed down; and an urging means for urging said accelerator pedal in a direction in which said accelerator pedal returns to the upper-limit position when said accelerator pedal is pressed down at the upper-limit position;

said resisting means including a friction damper in which a rotating portion which rotates by following the swinging motion of said accelerator pedal comes into contact with a non-rotatable portion so as to generate resistance;

said friction damper including a hollow cylindrical portion which has on an inner peripheral surface thereof a groove extending in an axial direction of the hollow portion;

said rotating portion including a rotating member disposed in said hollow cylindrical portion and connected to said rotating shaft;

said non-rotatable portion including a non-rotatable member disposed in said hollow cylindrical portion, said non-rotatable member having a projection on an outer peripheral surface thereof, said projecting engaging in said groove with said hollow cylindrical portion in such a manner that said non-rotatable member is movable in said axial direction but immovable about an axis of said hollow cylindrical portion.

9. The pedal device according to claim 8, wherein said rotating shaft is supported by mutually opposing portions of said supporting frame, and said friction damper is disposed in a space between the mutually opposing portions of said supporting frame.

10. The pedal device according to claim 8, wherein said friction damper is disposed coaxially with said rotating shaft.

11. The pedal device according to claim 8, wherein said friction damper is arranged to generate torque of a fixed value irrespective of displacement in the swinging motion of said accelerator pedal.

12. The pedal device according to claim 8, wherein said friction damper is arranged such that a value of the torque changes in correspondence with the displacement in the swinging motion of said accelerator pedal.

13. The pedal device according to claim 8, wherein said rotating shaft is rotatably supported by said supporting frame and is provided so as to rotate in interlocked relation to the swinging motion of said accelerator pedal, wherein said friction damper is disposed coaxially with said rotating shaft and includes an inner member into an interior of which said rotating shaft is inserted and which rotates integrally with said rotating shaft coaxially therewith, a tubular outer member disposed coaxially with said inner member on an outer side of said inner member in such a manner as to be unrotatable, a frictionally engaging means provided in an annular space on a radially outward side of said inner member and on a radially inward side of said outer member, and a resilient means provided in the annular space, wherein said frictionally engaging means has a first portion which rotates integrally with said inner member and a second portion which is unrotatable and is provided in such a manner as to be capable of coming into contact with said first portion, and wherein said resilient means is arranged to urge said first portion and said second portion in a direction in which said first portion and said second portion are brought into contact with each other and are pressed against each other.

14. The pedal device according to claim 8, wherein said rotating shaft is rotatably supported by said supporting frame and is provided so as to rotate in interlocked relation to the swinging motion of said accelerator pedal, wherein said friction damper is disposed coaxially with said rotating shaft and includes an inner member into an interior of which said rotating shaft is inserted and which rotates integrally with said rotating shaft coaxially therewith, a tubular outer member disposed coaxially with said inner member on an outer side of said inner member in such a manner as to be unrotatable, a frictionally engaging means provided in an annular space on a radially outward side of said inner member and on a radially inward side of said outer member, a resilient means provided in the annular space, and an urging-force varying means provided in the annular space, wherein said frictionally engaging means has a first portion which rotates integrally with said inner member and a second portion which is unrotatable and is provided in such a manner as to be capable of coming into contact with said first portion, wherein said resilient means is disposed between said frictionally engaging means and said urging-force varying means in the annular space and is arranged to urge said first portion and said second portion in a direction in which said first portion and said second portion are brought into contact with each other and are pressed against each other, and wherein said urging-force varying means is arranged to change an axially extending space for accommodating said resilient means, in correspondence with the relative rotational displacement of said inner member and said outer member.

15. The pedal device according to claim 8, wherein said resisting means includes said urging means.

* * * * *